(12) United States Patent
Yeh et al.

(10) Patent No.: US 10,473,994 B2
(45) Date of Patent: Nov. 12, 2019

(54) PIXEL UNIT AND DISPLAY PANEL

(71) Applicant: AU OPTRONICS CORP., Hsin-Chu (TW)

(72) Inventors: Chao-Wei Yeh, Hsin-Chu (TW); Wei-Cheng Cheng, Hsin-Chu (TW); Yi-Chi Lee, Hsin-Chu (TW); Chen-Chun Lin, Hsin-Chu (TW); Tien-Lun Ting, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 93 days.

(21) Appl. No.: 15/722,470

(22) Filed: Oct. 2, 2017

(65) Prior Publication Data

US 2018/0107040 A1  Apr. 19, 2018

(30) Foreign Application Priority Data

Oct. 17, 2016 (TW) .............................. 105133453 A

(51) Int. Cl.
*G02F 1/1368* (2006.01)
*G02F 1/1337* (2006.01)
*G02F 1/1343* (2006.01)
*G02F 1/1362* (2006.01)
*G02F 1/139* (2006.01)

(52) U.S. Cl.
CPC .......... *G02F 1/1368* (2013.01); *G02F 1/1393* (2013.01); *G02F 1/13439* (2013.01); *G02F 1/133707* (2013.01); *G02F 1/134309* (2013.01); *G02F 1/136213* (2013.01); *G02F 2001/134345* (2013.01)

(58) Field of Classification Search
CPC ............. G02F 1/1368; G02F 1/134309; G02F 1/133707; G02F 1/13439; G02F 1/136213; G02F 1/1393; G02F 2001/134345
See application file for complete search history.

(56) References Cited

U.S. PATENT DOCUMENTS

| | | | |
|---|---|---|---|
| 8,081,283 B2 | 12/2011 | Su | |
| 2004/0233360 A1 | 11/2004 | Yoshida et al. | |
| 2006/0038946 A1 | 2/2006 | Yoshida et al. | |
| 2007/0035685 A1 | 2/2007 | Yoshida et al. | |
| 2008/0143940 A1 | 6/2008 | Yoshida et al. | |

(Continued)

FOREIGN PATENT DOCUMENTS

| | | |
|---|---|---|
| CN | 102692769 A | 9/2012 |
| CN | 105278191 A | 1/2016 |

(Continued)

*Primary Examiner* — Michael H Caley
*Assistant Examiner* — Agnes Dobrowolski
(74) *Attorney, Agent, or Firm* — WPAT, PC

(57) ABSTRACT

A pixel unit includes a gate line, a first data line, a second data line, a first active device, and a pixel electrode. The first active device is electrically connected to the gate line and the first or second data line. The pixel electrode is electrically connected to the first active device. The pixel electrode includes a first sub-pixel electrode, a second sub-pixel electrode, and a first connecting electrode. Each of the first sub-pixel electrode and the second sub-pixel electrode includes a trunk electrode, a traverse trunk electrode, and branch electrodes. The first connecting electrode connects the first sub-pixel electrode to the second sub-pixel electrode.

20 Claims, 10 Drawing Sheets

(56) References Cited

U.S. PATENT DOCUMENTS

| | | | |
|---|---|---|---|
| 2009/0135321 A1* | 5/2009 | Su | G02F 1/134336 |
| | | | 349/37 |
| 2011/0141423 A1 | 6/2011 | Cheng et al. | |
| 2012/0075562 A1 | 3/2012 | Yeh et al. | |
| 2013/0003004 A1* | 1/2013 | Shimizu | G02F 1/133707 |
| | | | 349/130 |
| 2014/0327864 A1 | 11/2014 | Cheng et al. | |
| 2015/0253636 A1 | 9/2015 | Yeh et al. | |
| 2016/0026050 A1* | 1/2016 | Lin | G02F 1/136286 |
| | | | 349/43 |
| 2018/0364528 A1 | 12/2018 | Yeh et al. | |

FOREIGN PATENT DOCUMENTS

| | | |
|---|---|---|
| TW | 200424690 A | 11/2004 |
| TW | 201120547 A | 6/2011 |
| TW | 201213988 A | 4/2012 |
| TW | I499847 B | 9/2015 |

* cited by examiner

PIXEL UNIT AND DISPLAY PANEL

CROSS-REFERENCE TO RELATED APPLICATION

This application claims priority to Taiwan Application Serial Number 105133453, filed Oct. 17, 2016, which is herein incorporated by reference.

BACKGROUND

Field of Disclosure

The present disclosure relates to a pixel unit and a display panel.

Description of Related Art

Without being confined by a determined pretilt angle, liquid crystal molecules may irregularly rotate leftward or rightward, to form a disorder distribution, thus causing the contrast ratio, transmittance, and stability to be seriously decreased. For aligning liquid crystal molecules in specific directions, in a fabrication process of display panel, alignment layers are formed on inner surfaces of substrates. For example, the alignment layers are mostly formed by rubbing processes. In the rubbing processes, polymeric films, such as polyimide resins, are rubbed in a single direction by using a cloth or another similar material, such that the molecules of the polyimide resins may be arranged in a specific orientation. However, the alignment layers fabricated by the rubbing processes may be contaminated by impurities, and may have low yield because of static electricity, and the display panel may have a low contrast ratio resulting from contact of the cloth or similar material used in the rubbing processes.

For overcoming the problems caused by impurity contamination and cloth contact, various non-rubbing process are developed, in which a polymer stabilized alignment (PSA) has merits of simplifying fabrication process, reducing the contamination resulting from contact, lowering light leakage of display panel, and so on.

The fabrication process of the PSA liquid crystal display panel includes: adding a few photo-curable monomers into a liquid crystal material, applying voltages to the liquid crystal material to make the liquid crystal molecules have a pretilt angle, and irradiating the liquid crystal material by ultra-violet light so as to fix the pretilt angle of the light crystal molecules and achieve the stabilization of the polymers. Compared to a multi-domain vertical alignment (MVA) liquid crystal display panel which requires additional alignment structures such as alignment protrusions for aligning the light crystal molecules, the PSA liquid crystal display panel makes great improvement in the light leakage at a dark state. For increasing the contrast ratio and the viewing angle of the PSA liquid crystal display panel, every pixel has only four domains, and the liquid crystal molecules in different domains would be oriented in different directions when the voltages are applied thereto. However, because being a continuum, the liquid crystal molecules at the intersections of branch pixel electrodes extending in different directions would show a discontinuous arrangement, which decreases the liquid crystal efficiency. From a microscopic observation, dark fringes appear on pixels. At a macroscopic performance, the transmittance decreases, and the display quality is lowered.

SUMMARY

According to some embodiments of the present disclosure, a pixel unit includes a gate line, a first data line, a second data line, a first active device, and a pixel electrode. The gate line extends along a first direction. The first data line and the second data line extend along a second direction intersecting with the first direction. The first active device is electrically connected to the gate line and the first or second data line. The pixel electrode is electrically connected to the first active device, and includes a first sub-pixel electrode, a second sub-pixel electrode, and a first connecting electrode. The first sub-pixel electrode includes a first trunk electrode, a first traverse trunk electrode, and plural first branch electrodes. The first trunk electrode extends along substantially the same direction as that of the first data line and at least one portion of the first trunk electrode is overlapped with the first data line in a vertical projection direction. The first traverse trunk electrode intersects with the first trunk electrode so as to divide the first sub-pixel electrode to form a first region, and the first branch electrodes is connected with the first trunk electrode and/or the first traverse trunk electrode. The second sub-pixel electrode includes a second trunk electrode, a second traverse trunk electrode, and a plurality of second branch electrodes. The second trunk electrode extends along substantially the same direction as that of the second data line and at least one portion of the second trunk electrode is overlapped with the second data line in the vertical projection direction. The second traverse trunk electrode intersects with the second trunk electrode so as to divide the second sub-pixel electrode to form a second region, and the second branch electrodes is connected with the second trunk electrode and/or the second traverse trunk electrode. The first direction, the second direction, and the vertical projection direction are different. A gap is located between the first sub-pixel electrode and the second sub-pixel electrode, and the gap separates the first sub-pixel electrode from the second sub-pixel electrode. The first connecting electrode is located in the gap and connects the first sub-pixel electrode to the second sub-pixel electrode.

In some embodiments of the present disclosure, a width of the first connecting electrode along the second direction is not greater than a width of at least one of the first traverse trunk electrode and the second traverse trunk electrode along the second direction.

In some embodiments of the present disclosure, the first connecting electrode is connected with at least one of the first traverse trunk electrode of the first sub-pixel electrode and the second traverse trunk electrode of the second sub-pixel electrode.

In some embodiments of the present disclosure, the first region includes a first domain, a second domain, a third domain, and a fourth domain. The first branch electrodes in the first domain extends along a first extension direction, the first branch electrodes in the second domain extends along a second extension direction, the first branch electrodes in the third domain extends along a third extension direction, and the first branch electrodes in the fourth domain extends along a fourth extension direction. The second region includes a fifth domain, a sixth domain, a seventh domain, and an eighth domain. The second branch electrodes in the fifth domain extends along the first extension direction, the second branch electrodes in the sixth domain extends along the second extension direction, the second branch electrodes in the seventh domain extends along the third extension direction, and the second branch electrodes in the eighth domain extends along the fourth extension direction.

In some embodiments of the present disclosure, the pixel unit further includes a main display area and a sub display area disposed on two sides of the gate line. Plural the pixel electrodes are respectively located in the main display area and the sub display area. The pixel unit further includes a second active device, wherein the first active device is connected with one of the pixel electrodes in the main display area and the sub display area, and the second active device is connected with another one of the pixel electrodes in the main display area and the sub display area.

In some embodiments of the present disclosure, a width of the first data line along the first direction is smaller than a width of the first trunk electrode along the first direction.

In some embodiments of the present disclosure, a slit is located between every adjacent two of the first branch electrodes, and a width of the slit is smaller than or equal to a width of one of the first branch electrodes.

In some embodiments of the present disclosure, a width of the gap along the first direction is greater than the width of the slit, and the width of the gap along the first direction is smaller than a sum of the width of the slit and the width of one of the first branch electrodes.

In some embodiments of the present disclosure, the lengths of the first branch electrodes disposed on two sides of the first trunk electrode are different.

In some embodiments of the present disclosure, the first sub-pixel electrode has a first projection shape on the vertical projection direction, the first projection shape has a first dividing region parallel with the second direction, and the first trunk electrode is not overlapped with at least one portion of the first dividing region.

In some embodiments of the present disclosure, the second sub-pixel electrode has a second projection shape on the vertical projection direction, the second projection shape has a second dividing region parallel with the second direction, and the second trunk electrode is not overlapped with at least one portion of the second dividing region.

In some embodiments of the present disclosure, the gap extends substantially along the second direction, and a length of the gap is substantially equal to a length of at least one of the first sub-pixel electrode and the second sub-pixel electrode along the second direction.

In some embodiments of the present disclosure, the pixel electrode has a projection shape on the vertical projection direction, the projection shape has a dividing region parallel with the second direction, and the gap is overlapped with at least one portion of the dividing region.

In some embodiments of the present disclosure, the first sub-pixel electrode comprises a first border electrode connected with ends of the first branch electrodes.

In some embodiments of the present disclosure, the second sub-pixel electrode comprises a second border electrode connected with ends of the second branch electrodes.

In some embodiments of the present disclosure, the pixel unit includes a shielding electrode and a color-filter layer. The shielding electrode is disposed at least one edge of the pixel electrode. The color-filter layer is disposed between the pixel electrode and the shielding electrode. The color-filter layer includes a first color-filter region and a second color-filter region connected to the first color-filter region, the first color-filter region is disposed corresponding to the pixel electrode, the shielding electrode covers a connecting portion of the first color-filter region and the second color-filter region, and the first color-filter region and the second color-filter region have different colors.

According to some embodiments of the present disclosure, the display panel includes plural pixel units, a counter substrate, and a display medium. The pixel units are disposed on a substrate. The counter substrate is disposed opposite to the substrate. The display medium is disposed between the substrate and the counter substrate.

It is to be understood that both the foregoing general description and the following detailed description are by examples, and are intended to provide further explanation of the disclosure as claimed.

DETAILED DESCRIPTION

Figure 1A:
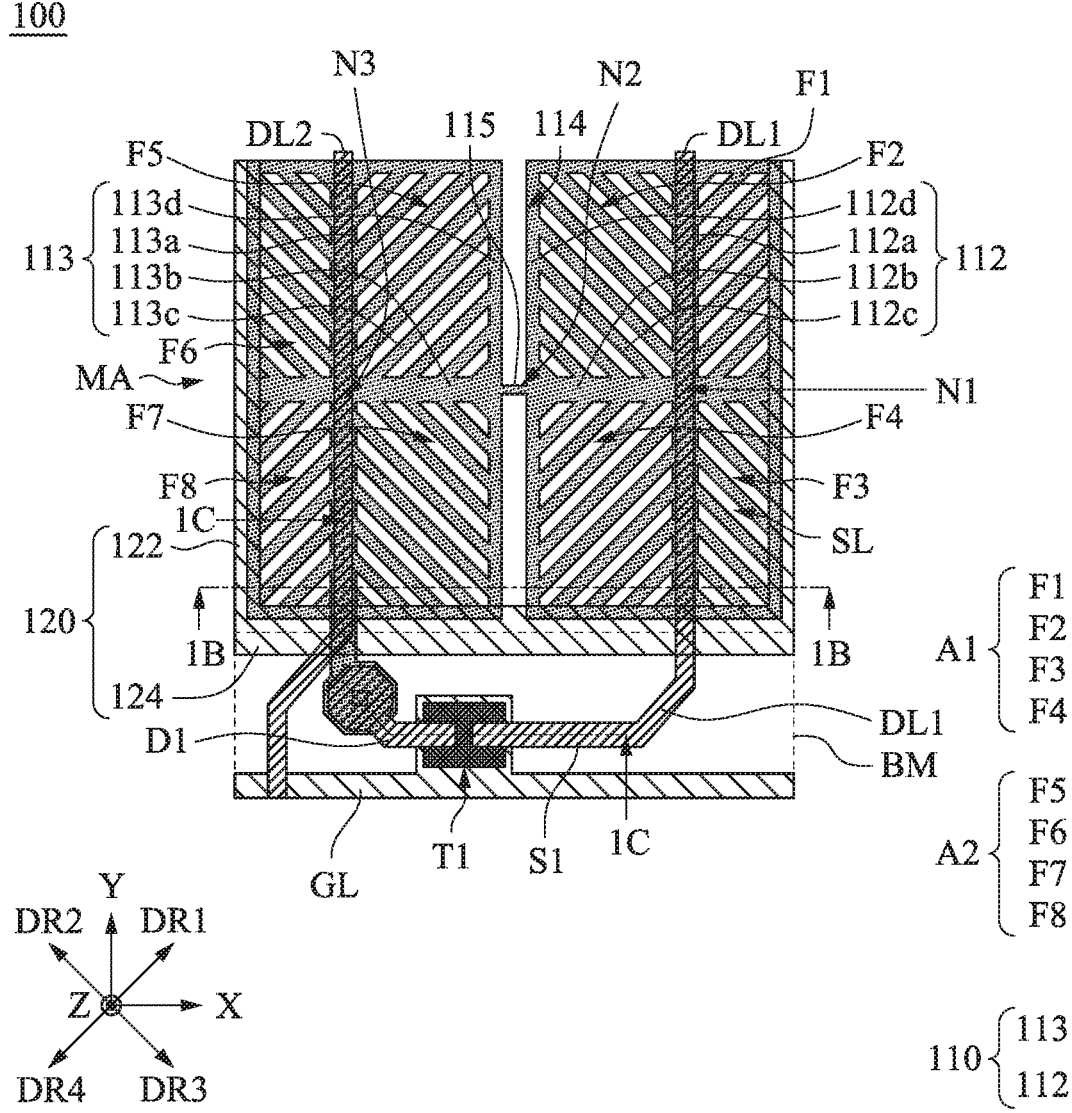
FIG. 1A is a schematic top view of a pixel unit according to one embodiment of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connected" may refer to a physical and/or electrical connection.

"About" or "substantially/approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, ±10%, ±5%, or others of the stated value. Furthermore, "about", "approximate" or "substantially" acceptable range of deviation or standard deviation may be selected in terms of optical properties, etch properties, or other properties, and may not apply one standard deviation to the all properties.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

A plurality of implementation manners of the present disclosure are disclosed with reference to drawings. To make the description clear, many practical details are described in the description below. However, it should be understood that the practical details shall not be used to limit the present disclosure. That is, in some implementation manners of the present disclosure, the practical details are not necessary. Besides, in order to simplify the drawings, some conventional and common structures and elements are shown in the drawings in a simple and schematic manner.

FIG. 1A is a schematic top view of a pixel unit 100 according to one embodiment of the present disclosure. The pixel unit 100 of the present embodiment is applicable to an active device array substrate of a liquid crystal display panel. The pixel unit 100 includes a gate line GL1, a first data line DL1, a second data line DL2, a first active device T1, and a pixel electrode 110. For example, the gate line GL1 extends along a first direction (e.g., a horizontal direction X), and the first data line DL1 and the second data line DL2 extend along a second direction (e.g., a vertical direction Y). The first active device T1 is electrically connected with the gate line GL1, the first data line DL1, and the pixel electrode 110. Herein, for improving the display effect of pixel unit 100, the pixel electrode 110 includes a first sub-pixel electrode 112, a second sub-pixel electrode 113, and a first connecting electrode 115. A gap 114 is located between the first sub-pixel electrode 112 and the second sub-pixel electrode 113. Through the following configuration of the first sub-pixel electrode 112 and the second sub-pixel electrode 113, the orientation of the liquid crystal molecules can be well controlled to reduce the dark fringes of the pixel unit 100 and enhancing the transmittance of the liquid crystal layer.

To be specific, the first sub-pixel electrode 112 includes a first trunk electrode 112a, a first traverse trunk electrode (or namely first horizontal trunk electrode) 112b, and plural first branch electrodes 112c. In some embodiments, the first trunk electrode 112a extends along substantially the same direction as that of the first data line DL1 and at least one portion of the first trunk electrode 112a is overlapped with the first data line DL1 in a vertical projection direction. The first traverse trunk electrode 112b intersects with the first trunk electrode 112a so as to divides the first sub-pixel electrode 112 to form a first region A1. For example, the first region A1 includes a first domain F1, a second domain F2, a third domain F3, and a fourth domain F4. Herein, the extension directions of the first traverse trunk electrode 112b and the first trunk electrode 112a are substantially orthogonal to each other, but embodiments of the present disclosure are not limited thereto. A portion of the first branch electrodes 112c are connected with the first trunk electrode 112a, and a portion of the first branch electrodes 112c are connected with the first traverse trunk electrode 112b. The first branch electrodes 112c in the first domain F1, the second domain F2, the third domain F3, and the fourth domain F4 respectively have substantially the same directions. For example, as shown in FIG. 1A, the first branch electrodes 112c in the first domain F1 respectively extend toward a first extension direction DR1. The first branch electrodes 112c in the second domain F2 respectively extend toward a second extension direction DR2. The first branch electrodes 112c in the third domain F3 respectively extend toward a third extension direction DR3. The first branch electrodes 112c in the fourth domain F4 respectively extend toward a fourth extension direction DR4. An angle between the first trunk electrode 112a and one of the first branch electrodes 112c or/and an angle between the first traverse trunk electrode 112b and one of the first branch electrodes 112c is/are preferred to be about 45 degrees, but it should not limit the scope of the present disclosure. Herein, the extension directions of the first trunk electrode 112a, the first traverse trunk electrode 112b, and the first branch electrodes 112c approximately form a shape of an eight-pointed star (or namely snow-flake like), but the scope of the present disclosure is not limited thereto.

In some embodiments of the present disclosure, a slit SL is located between every two adjacent first branch electrodes 112c. In some embodiments, the widths of the slit SL and the first branch electrode 112c are appropriately arranged, such that, when liquid crystal molecules are tilted under the influence of a vertical electric field, the liquid crystal molecules may be arranged along the directions of the slits SL (such as the extension directions of the first branch electrodes 112c), thereby realizing a configuration of multi-domain alignment. For example, the width L1 of the slit SL can be designed to be smaller than or substantially equal to the width L2 of the first branch electrode 112c.

Similarly, the second sub-pixel electrode 113 has a structure similar to that of the first sub-pixel electrode 112. The second sub-pixel electrode 113 includes a second trunk electrode 113a, a second traverse trunk electrode (or namely second horizontal trunk electrode) 113b, and plural second branch electrodes 113c. The second trunk electrode 113a extends along substantially the same direction as that of the second data line DL2, and at least one portion of the second trunk electrode 113a is overlapped with the second data line DL2 in the vertical projection direction. The second traverse trunk electrode 113b intersects with the second trunk electrode 113a so as to divide the second sub-pixel electrode 113 to form a second region A2. To be specific, the second region A2 includes a fifth domain F5, a sixth domain F6, a seventh domain F7, and an eighth domain F8. Herein, the extension directions of the second traverse trunk electrode 113b and the second trunk electrode 113a are orthogonal to each other, but the scope of the present disclosure is not limited thereto. A portion of the second branch electrodes 113c are connected with the second trunk electrode 113a, and a portion of the second branch electrodes 113c are connected with the second traverse trunk electrode 113b. For example, as shown in FIG. 1A, the second branch electrodes 113c in the fifth domain F5 respectively extend toward the first extension direction DR1. The second branch electrodes 113c in the sixth domain F6 respectively extend toward the second extension direction DR2. The second branch electrodes 113c in the seventh domain F7 respectively extend toward the third extension direction DR3. The second branch electrodes 113c in the eighth domain F8 respectively extend toward the fourth extension direction DR4. An angle between the second trunk electrode 113a and one of the second branch electrodes 113c or/and an angle between the second traverse trunk electrode 113b and one of the second branch electrodes 113c is/are about 45 degrees, but the scope of the present disclosure is not limited thereto. Herein, the extension directions of the second trunk electrode 113a, the second traverse trunk electrode 113b, and the second branch electrodes 113c approximately forms a shape of an eight-pointed star (or namely snow-flake like), but the scope of the present disclosure is not limited thereto.

Figure 1B:
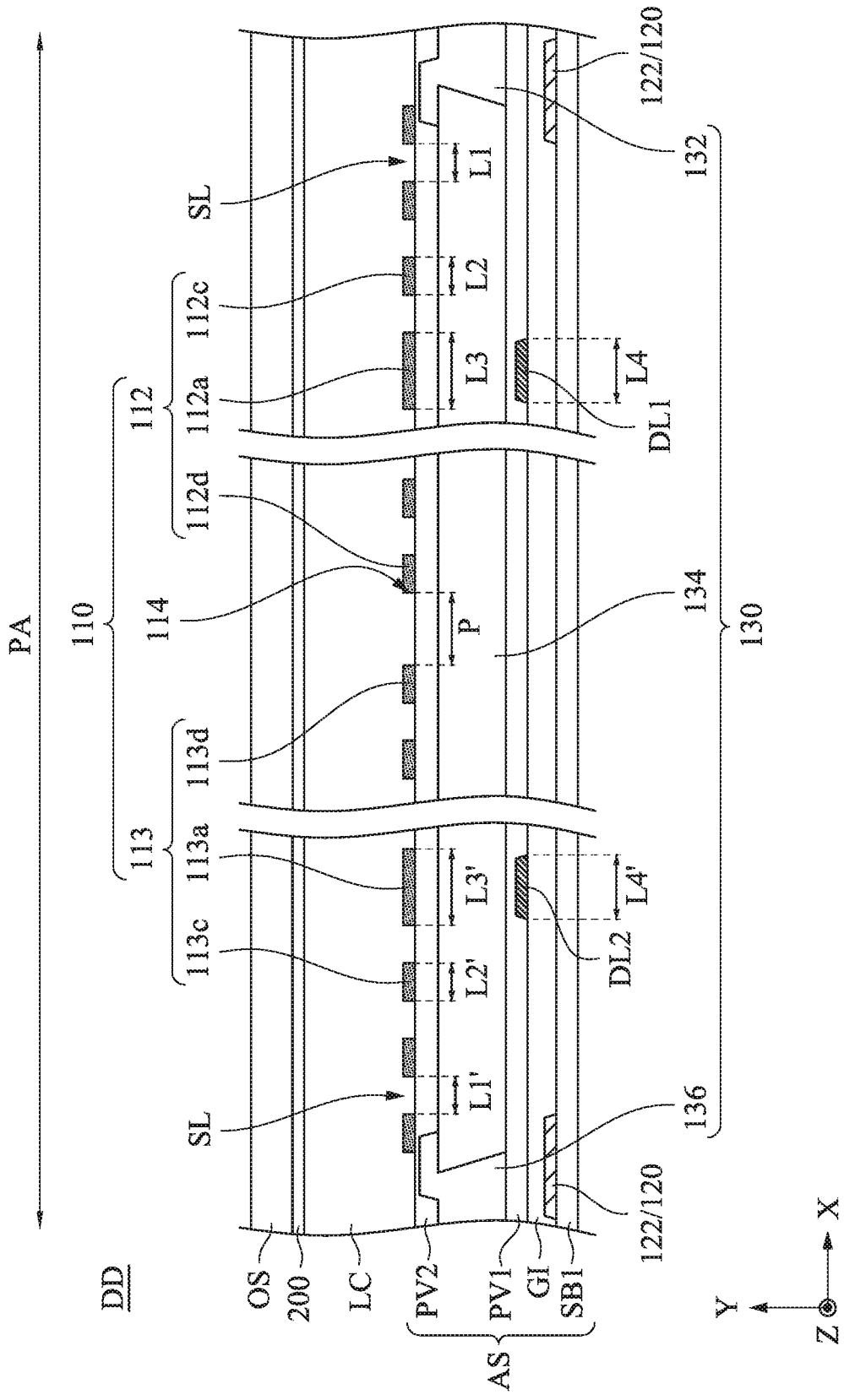
FIG. 1B is a schematic cross-sectional view taken along line 1B-1B of FIG. 1A.

Reference is made to FIG. 1A and FIG. 1B. A slit SL is also located between every two adjacent second branch electrodes 113c, and the detail configurations are similar to that of the first branch electrodes 112c. When liquid crystal molecules are tilted under the influence of a vertical electric field, the liquid crystal molecules may be arranged along the directions of the slits SL (such as the extension directions of the second branch electrodes 113c), thereby realizing a configuration of multi-domain alignment. The width L1' of the slit SL can be designed to be smaller than or substantially equal to the width L2' of the second branch electrode 113c.

A width L3 of the first trunk electrode 112a is greater than a width L4 of the first data line DL1, and the width L3' of the second trunk electrode 113a is greater than a width L4' of the second data line DL2. Through the configuration, the first data line DL1 and the second data line DL2 are respectively shielded by the first trunk electrode 112a and the second trunk electrode 113a, such that when a voltage is applied in the process of displaying images, the first data line DL1 or the second data line DL2 is prevented from generating an abruptly strong electric field which may result in problems such as a light leakage at a dark state or a crosstalk.

A gap 114 is located between the first sub-pixel electrode 112 and the second sub-pixel electrode 113, and the gap 114 separates the first sub-pixel electrode 112 from the second sub-pixel electrode 113. For example, the gap 114 extends along the second direction (e.g., the direction Y), and the length of the gap 114 is substantially equal to a length of at least one of the first sub-pixel electrode 112 and the second sub-pixel electrode 113 along the second direction (e.g., the direction Y). That is, the length of the gap 114 along the second direction (e.g., the direction Y) is substantially equal to the length of the first sub-pixel electrode 112 along the second direction (e.g., the direction Y) or/and the length of the second sub-pixel electrode 113 along the second direction (e.g., the direction Y). For example, the gap 114 is taken as an axis of symmetry, such that the first sub-pixel electrode 112 and the second sub-pixel electrode 113 are substantially mirror-symmetric with respect to the gap 114. The first connecting electrode 115 is located in the gap 114 and connects the first sub-pixel electrode 112 to the second sub-pixel electrode 113. In the present embodiment, the first connecting electrode 115 is connected with the first traverse trunk electrode 112b of the first sub-pixel electrode 112 and the second traverse trunk electrode 113b of the second sub-pixel electrode 113, but the scope of the present disclosure is not limited thereto. In other embodiments, the first connecting electrode 115 may connect other portions of the first sub-pixel electrode 112 to other portions of the second sub-pixel electrode 113 and realize electrical connection.

In the embodiments of present disclosure, for example, in the first region A1 and the second region A2, nodes N1~N3 are respectively located at the intersection of the first trunk electrode 112a and the first traverse trunk electrode 112b, the intersection of the gap 114 and the first connecting electrode 115, and the intersection of the second trunk electrode 113a and the second traverse trunk electrode 113b, which will be further illustrated later. In the present embodiments, the two electrodes with shapes of eight-pointed stars (or namely snow-flake like) are adopted, and therefore the various domains F1~F8 have various alignment directions, such that the nodes N1~N3 have their own strength of disclination (DS) respectively.

Figure 2A:
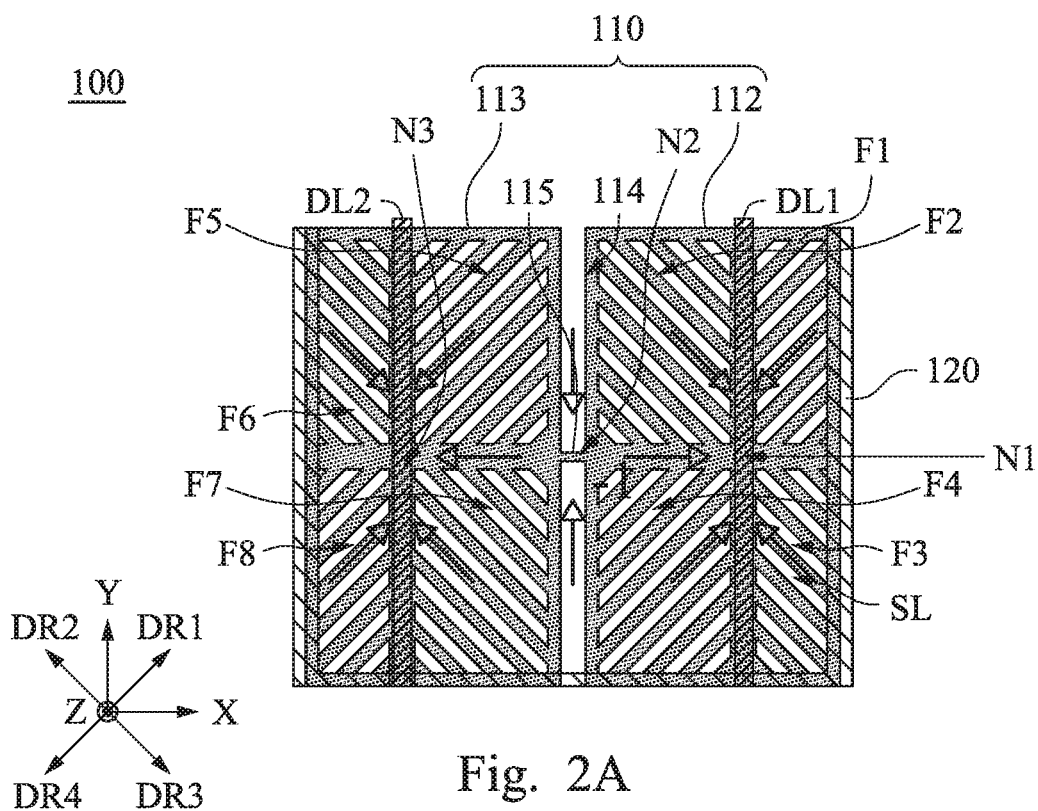
FIG. 2A is a schematic view showing strengths of declination lines regarding a liquid crystal distribution of FIG. 1A.
Figure 2B:
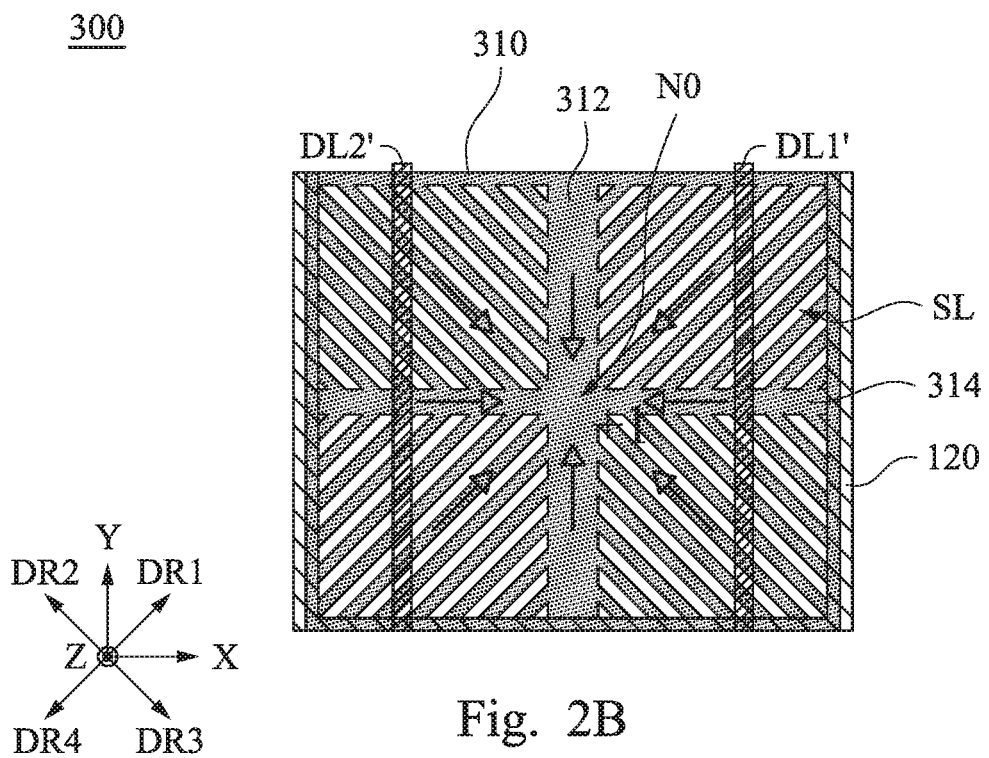
FIG. 2B is a schematic view showing strengths of declination lines regarding a liquid crystal distribution of a pixel unit according to a comparison embodiment.

Reference is made to FIG. 1A, FIG. 2A, and FIG. 2B. FIG. 2A is a schematic view showing strengths of declination lines regarding a liquid crystal distribution of FIG. 1A. FIG. 2B is a schematic view showing strengths of declination lines regarding a liquid crystal distribution of a pixel unit 300 according to a comparison embodiment. In FIG. 2A and FIG. 2B, hollow arrows indicate the directions that liquid crystal molecules are tilted toward. In FIG. 2A, the node N1 is located at the intersection of the first trunk electrode 112a and the first traverse trunk electrode 112b, and the orientations of the liquid crystal molecules in the first region A1 (e.g., the first extension direction DR1, the second extension direction DR2, the third extension direction DR3, and the fourth extension direction DR4 that the first branch electrodes 112c extends along) tends to direct toward the nodes N1 or away from the nodes N1, such that the node N1 has a strength of disclination of +1. The definition of the strength of disclination may be found in *Soft Matter Physics: An Introduction Soft Matter Physics: An Introduction*, Maurice Kleman Oleg D. Lavrentovich, Springer, 2001, 388-396. Similarly, regarding the node N3 located at the intersection of the second trunk electrode 113a and the second traverse trunk electrode 113b, the orientations of the liquid crystal molecules in the second region A2 (e.g., the first extension direction DR1, the second extension direction DR2, the third extension direction DR3, and the fourth extension direction DR4 that the second branch electrodes 113c extends along) tends to direct toward the nodes N3 or away from the nodes N3, such that the node N3 has a strength of disclination of +1.

FIG. 2B is a schematic view showing strengths of declination lines regarding a liquid crystal distribution of a pixel unit 300 according to a comparison embodiment. The pixel unit 300 includes only one single pixel electrode 310 and has four different domains. The pixel electrode 310 includes a vertical trunk electrode 312 extending along the vertical direction Y and a horizontal trunk electrode 314 extending along the horizontal direction X, and the vertical trunk electrode 312 in a projection direction Z is not overlapped with a first data line DL1' and a second data line DL2' in a projection direction Z. Therefore, the single pixel electrode 310 does not include a gap but merely slits between two branch electrodes. A single node NO located at the intersection of the vertical trunk electrode 312 and the horizontal trunk electrode 314 has a strength of disclination of +1. The node NO is located between the first data line DL1' and the second data line DL2' along the horizontal direction X. However, the orientations of liquid crystal molecules or disclination lines near the node NO may be distorted, which results in low liquid crystal efficiency. In the embodiment shown in FIG. 2A, the nodes N1 and N3 having the strength of disclination of +1 are located above the first data line DL1 and the second data line DL2 respectively, and therefore the distortion of the orientation of liquid crystal molecules or disclination lines near the nodes N1 and N3 are shielded and less affects the liquid crystal efficiency.

In FIG. 2A, the node N2 is located at the intersection of the gap 114 and the first connecting electrode 115. The gap 114 in the pixel electrode 110 is arranged appropriately. For example, along a vertical projection direction (e.g., the direction Z), the pixel electrode 110 has a projection shape (e.g., similar to the shape formed by connecting the outer edges or rims of the first sub-pixel electrode 112 and the second sub-pixel electrode 113), and the projection shape has a dividing region substantially parallel with the second direction (e.g., the direction Y). The dividing region may be referred to a region or line dividing the projection shape into two portions that are symmetric or have even distance. For example, the two portions on two opposite sides of the dividing region have substantially the same shape and area. The gap 114 is overlapped with at least a portion of the dividing region. Nevertheless, in FIG. 2A, since the orientations of the liquid crystal molecules in the second domain F2, the fourth domain F4, the fifth domain F5, and the seventh domain F7 (e.g., the second extension direction DR2 and the fourth extension direction DR4 that the first branch electrodes 112c extends along and the first extension direction DR1 and the third extension direction DR3 that the second branch electrodes 113c extends along) do not direct toward the nodes N2 all or away from the nodes N2 all, the liquid crystal efficiency is less affected.

Through the configuration, the strength of disclination of the node N2 is kept to be −1. The disclination lines adjacent to the node having strength of disclination of +1 is wider than the disclination line adjacent to the node having the strength of disclination of −1, and the liquid crystal adjacent to the nodes having the strength of disclination of +1 tend to be distorted, thus decreasing the liquid crystal efficiency. In some embodiments of the present disclosure, the nodes N1 and N3 having the strength of disclination of +1 are shielded by the first data line DL1 and the second data line DL2 respectively, thereby preventing the wide disclination lines and distortion of the orientation of liquid crystal molecule from lowering the transmittance of liquid crystal. The nodes N2 having the strength of disclination of −1 does not induce the distortion of the orientation of liquid crystal molecules, and the disclination lines nearby are thinner. As a result, the nodes N2 can increase the transmittance of liquid crystal without the configuration of other shielding element (e.g., a shielding electrode, a data line, or a black matrix).

For example, in actual manipulation, the pixel unit 100 may be sandwiched by two polarizers with the transmission axes of the polarizers are substantially orthogonal to each other. The two substantially orthogonal polarizers are rotated while the pixel unit 100 is stationary and not rotated, and based on the direction of the rotation of the disclination lines, the strength of disclination of the respective nodes may be identified to be +1 or −1. To be specific, when the two substantially orthogonal polarizers are rotated clockwise, if it is observed that the disclination lines rotate clockwise, the strength of disclination of the node is +1. When the two substantially orthogonal polarizers are rotated clockwise, if it is observed that the disclination lines rotate counterclockwise, the strength of disclination of the node is −1. The scale of the strength of disclination of the node is related to the number of disclination lines. Herein, each of the nodes N1~N3 includes about four disclination lines, and the scale is about 1. In actual application, the electrode adjacent to the nodes N1~N3 may be designed in other configurations, thereby generating different numbers of disclination lines. For the reasons, the scale of the strengths of disclination of nodes N1 and N3 should not limit the scope of the present disclosure, and the method for identifying the strength of disclination should not limit the scope of the present disclosure.

In some embodiments, a width of the first connecting electrode 115 is not greater than a width of at least one of the first traverse trunk electrode 112b and the second traverse trunk electrode 113b. Herein, the width of the first connecting electrode 115 is referred to the length of the first connecting electrode 115 along a direction substantially parallel with the extension direction of the gap 114 (such as also referred to the extension direction of the first trunk electrode 112, the second trunk electrode 113, a first data line DL1, or the second data line DL2, i.e. the second direction Y), and the widths of the first traverse trunk electrode 112b and the second traverse trunk electrode 113b are also defined in a similar way. In the present embodiment, the width of the first connecting electrode 115 is smaller than the width of at least one of the first traverse trunk electrode 112b and the second traverse trunk electrode 113b. Through the configuration, the strength of disclination of the node N2 is limited to be −1, which prevents the disclination lines from being distorted.

In some embodiments of the present disclosure, the width P of the gap 114 (shown in FIG. 1B) is greater than the width L1 of the slits SL, and the width P of the gap 114 is smaller than a sum of the width L1 of one of the slits SL and the width L2 of one of the first branch electrodes 112c or a sum of the width L1' of one of the slits SL and the width L2' of one of the second branch electrodes 113c. Through the configuration, the orientation of liquid crystal molecules adjacent to the gap 114 is confined effectively, thereby keeping the liquid crystal efficiency near the gap 114 to be well when a voltage is applied. Of course, the scope of the present disclosure is not limited thereto, and in other embodiments, the gap 114 may be configured with an appropriate width.

In some embodiments of the present disclosure, the sizes of the first branch electrodes 112c respectively disposed on two opposite sides of the first trunk electrode 112a are different. To be specific, the sizes of the first branch electrodes 112c respectively connected to the two opposite sides of the first trunk electrode 112a have different lengths in a direction substantially parallel to the first traverse trunk electrode 112b. For example, the size of the first domain F1 is different from the size of the second domain F2. This kind of asymmetric structure helps liquid crystal molecules be tilted, and therefore further enhances the order of the liquid crystal molecules. For example, along a vertical projection direction (e.g., the direction Z), the first sub-pixel electrode 112 has a first projection shape (i.e. similar to the shape formed by connecting the outer edges or rims of the first sub-pixel electrode 112 shown in FIG. 1A), and the first projection shape has a first dividing region substantially parallel with the second direction (e.g. the direction Y). The first dividing region may be referred to a region or line dividing the first projection shape into two portions that are symmetric or have even distance. For example, the two portions on two opposite sides of the first dividing region have substantially the same shape and area, and the first trunk electrode 112a is not overlapped with at least a portion of the first dividing region. Similarly, the second sub-pixel electrode 113 is also designed in this way, and the sizes of the second branch electrodes 113c respectively disposed on and connected to two opposite sides of the second trunk electrode 113a are different. For example, along a vertical projection direction (e.g., the direction Z), the second sub-pixel electrode 113 has a second projection shape (i. e. similar to the shape formed by connecting the outer edges or rims of the second sub-pixel electrode 113 shown in FIG. 1A), and the second projection shape has a second dividing region substantially parallel with the second direction (e.g., the direction Y). The second dividing region may be referred to a region or line dividing the second projection shape into two portions that are symmetric or have even distance. For example, the two portions on two opposite sides of the second dividing region have substantially the same shape and area, and the second trunk electrode 113a is not overlapped with at least a portion of the second dividing region.

In the embodiments of the present disclosure, the first sub-pixel electrode 112 further includes a first fringe electrode 112d connected with ends of the first branch electrodes 112c. Herein, the first fringe electrode 112d is connected with ends of all the first branch electrodes 112c, but the scope of the present disclosure is not limited thereto. In other embodiments, the first fringe electrode 112d is connected with ends of a portion of all the first branch electrodes 112c, and the first fringe electrode 112d may be plural continuous or discrete segments. Through the configuration, it prevents the unstably distortion of the orientation of liquid crystal molecules due to the variance of the voltage potentials of the ends of the first branch electrode 112c. Similarly, the second sub-pixel electrode 113 may be designed in this way, and the second sub-pixel electrode 11 may include the second fringe electrode 113d which is connected with ends of the second branch electrodes 113c. Herein, the second fringe electrode 113d is connected with ends of all the second branch electrodes 113c, but the scope of the present disclosure is not limited thereto. In other embodiments, the second fringe electrode 113d is connected with ends of a portion of all the second branch electrodes 113c, and the second fringe electrode 113d may be plural continuous or discrete segments.

In some embodiment, the second data line DL2 may be connected to appropriate active devices, so as to control other elements (not shown). Alternatively, in some embodiments, the second data line DL2 may not be connected to any active device.

The various active devices (such as the first active device T1) in the embodiments of the present disclosure may be various semiconductor devices, such as transistors, diodes, or other appropriate device. The materials of the semiconductor devices include polycrystalline silicon, monocrystalline silicon, nanocrystalline silicon, amorphous silicon, organic semiconductor material, metal-oxide semiconductor materials, other appropriate materials, or a combination of at least two aforementioned materials. The first active device T1 may include a control end (such as gate electrode G1) and two ends (such as source electrode S1 and drain electrode D1) that are controlled to conduct or not by the control end.

FIG. 1B is a schematic cross-sectional view taken along line 1B-1B of FIG. 1A. Herein, FIG. 1B depicts a structure of a pixel area PA of a display device DD. The display device DD may include a substrate SB1 having plural pixel units 100, a counter substrate OS, and a liquid crystal layer LC. In the embodiments of the present disclosure, the polymer-stabilized alignment (PSA) display device DD may be adopted. For example, negative liquid crystal molecules are configured to be aligned in multi-domains, for example, with a polymeric vertical alignment layer (not shown). After that, the liquid crystal molecules may be controlled by a vertical electric field built by the pixel electrode 110 and a counter electrode 200 of the counter substrate OS and arranged horizontally according to the directions of respective electrodes. Thus, the display displays images by the method of multi-domains. It is noted that, the configuration of multi-domains should not limit the scope of the present disclosure. In other embodiments, liquid crystal display may be designed without the configuration.

Herein, the substrate SB1 may optionally include plural layers, such as a shielding electrode 120, a gate dielectric layer GI, a first planarization layer PV1, a color filter layer 130, and a second planarization layer PV2. The substrate SB1 and the layers formed thereon are referred to as an active device arrayed substrate AS.

The shielding electrode 120 is disposed on at least one outer edge of the pixel electrode 100, so as to shield the light leakage between two adjacent pixel electrodes 100 or inside the single pixel electrodes 100, and improving the displaying performance of display panel. For example, the shielding electrode 120, the gate electrode G1, and the first gate line GL1 may be formed by the same first conductive layer (e.g., a conductive metal) on the substrate SB1 and separated from each other. However, the scope of the present disclosure is not limited thereto. The shielding electrode 120 may be connected to the ground or other fixed potentials. In some embodiments, the black matrix BM is not disposed above a region inside the display device DD corresponding to the pixel electrode 100, the first data line DL1, or the second data line DL2, but only above the gate line GL1 and a region inside the display device DD corresponding to the first active device T1. In addition, the pixel region may be defined by the shielding electrode 120. Through the configuration, when the display device DD is curved (e.g., the substrate SB1 is bent), the light leakage in the dark sate and the reduction of transmittance result from the shift of the black matrix, which results from the curved configuration, are prevented. Moreover, the black matrix may be disposed on the substrate SB1 or the counter substrate OS.

Figure 1C:
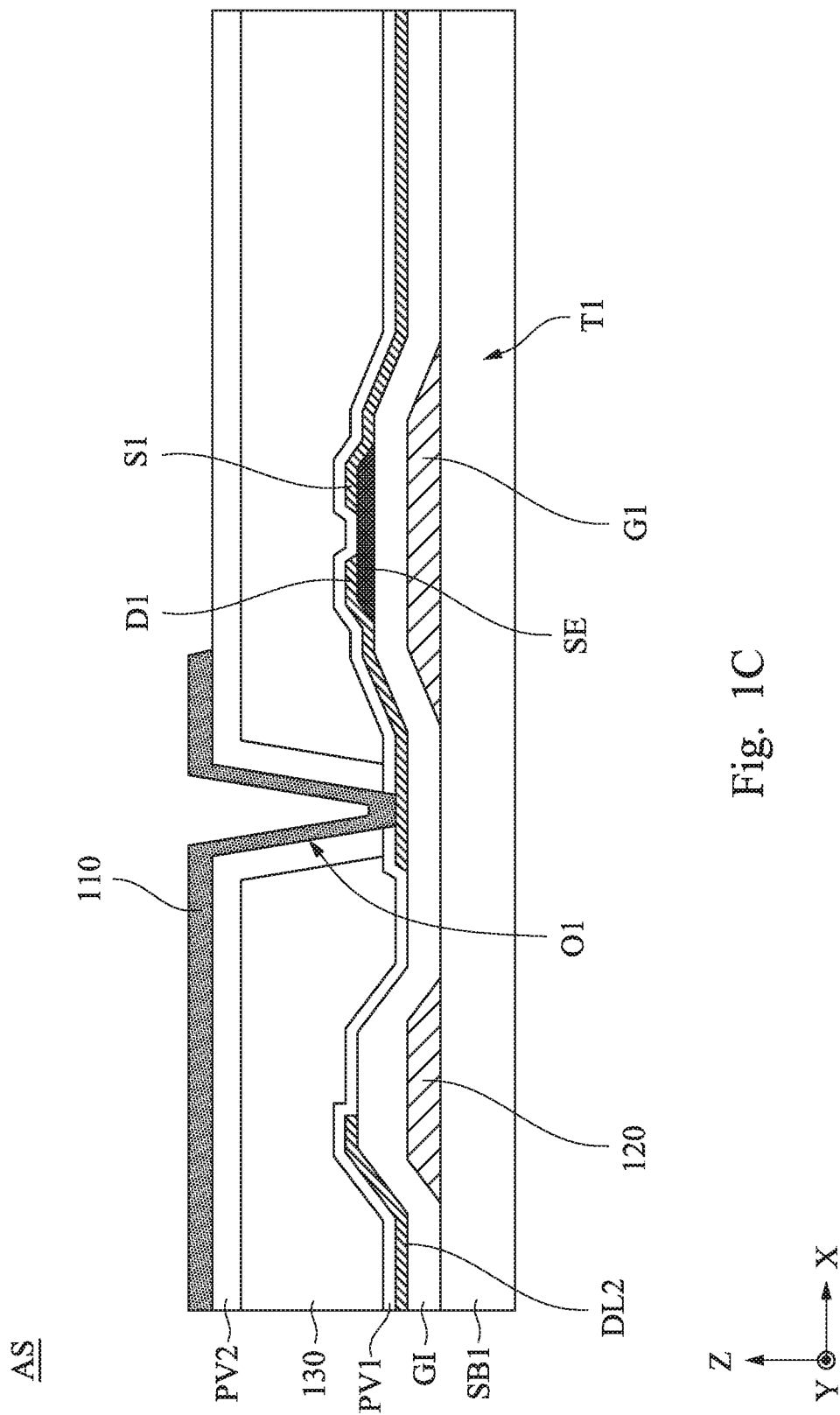
FIG. 1C is a schematic cross-sectional view taken along line 10-10 of FIG. 1A.

FIG. 1C is a schematic cross-sectional view taken along line 1C-1C of FIG. 1A. Referring to FIG. 1A, FIG. 1B, and FIG. 1C. A semiconductor layer SE is disposed on the substrate SB1. A gate dielectric layer GI is disposed on the shielding electrode 120, the gate electrode G1, and the first gate line GL1. The semiconductor layer SE is disposed on the gate dielectric layer GI. The source S1 and the drain D1 are disposed on the semiconductor layer SE. The first data line DL1, the second data line DL2, the source S1, and the drain D1 may be formed by the same second conductive layer (e.g., a conductive metal). However, the scope of the present disclosure is not limited thereto. The gate dielectric layer GI electrically isolates the second conductive layer (e.g. the first data line DL1, the second data line DL2) and the semiconductor layer SE from the first conductive layer (e.g. shielding electrode 120, the gate electrode G1, and the first gate line GL1).

A first planarization layer PV1 may be optionally formed over the first data line DL1 and the second data line DL2, so that the color-filter layer 130 is formed thereon. The color-filter layer 130 includes a first color-filter region 132, a second color-filter region 134, and a third color-filter region 136, such as the green materials, the red materials, and the blue materials, and they respective disposed in the pixel regions PA. That is, the three color-filter regions are disposed corresponding to the pixel electrodes respectively. In the present embodiments, it is taken as an example that the second color-filter region 134 is disposed corresponding to the pixel region PA, which means the second color-filter region 134 is disposed corresponding to the pixel electrode 110. Therefore, the first color-filter region 132 is disposed corresponding to another pixel region PA, which means the first color-filter region 132 is disposed corresponding to another pixel electrode, and the third color-filter region 136 is disposed corresponding to further another pixel region PA, which means the third color-filter region 136 is disposed corresponding to further another pixel electrode. As a result, an end of the second color-filter region 134 is connected with the first color-filter region 132 has connecting region (portion), and another end of the second color-filter region 134 is connected with the third color-filter region 136 has another connecting region (portion). The shielding electrode 120 may shields the connecting region (portion) of the first color-filter region 132 and the second color-filter region 134, and the another connecting region (portion) of the second color-filter region 134 and the third color-filter region 136, thereby reducing the possibility of blended light and light leakage in dark state.

A second planarization layer PV2 may be optionally formed over the color-filter layer 130, so that the pixel electrode 110 is formed thereon. Herein, the color-filter layer 130 is disposed between the pixel electrode 110 and the shielding electrode 120. The second planarization layer PV2, the color-filter layer 130, and the first planarization layer PV1 may have an opening O1 (as shown in FIG. 1C), through which the pixel electrode 110 is electrically connected to the drain D1.

In the embodiments of the present disclosure, the substrate SB1 may be formed by glass, organic materials, or other suitable materials. The gate dielectric layer GI, the first planarization layer PV1, and the second planarization layer PV2 may be formed by inorganic materials (e.g., silicon oxide, silicon nitride, silicon oxynitride, other suitable materials, or the combination thereof), organic materials (e.g., photoresist, polyimide (PI), benzocyclobutene (BCB), epoxy, perfluorocyclobutane (PFCB), other suitable materials, or the combination thereof), other suitable materials, or the above combination thereof. The pixel electrodes 110 may be transmissive pixel electrodes, reflective pixel electrodes, or transflective pixel electrodes. A material of the transmissive pixel electrodes may include metal oxides (e.g., indium tin oxides, indium zinc oxides, aluminum tin oxides, aluminum zinc oxides, indium germanium zinc oxides, other suitable materials, or at least two of the above combination thereof), carbon nanotubes, organic conductive materials, or reflective materials with a thickness smaller than 60 angstroms, other suitable materials, or the combination of at least two aforementioned materials stacked up. The counter electrode 200 may be formed by a transparent conductive material, and the materials of the counter electrode 200 and the pixel electrode 110 may be substantially the same or different.

Figure 3:
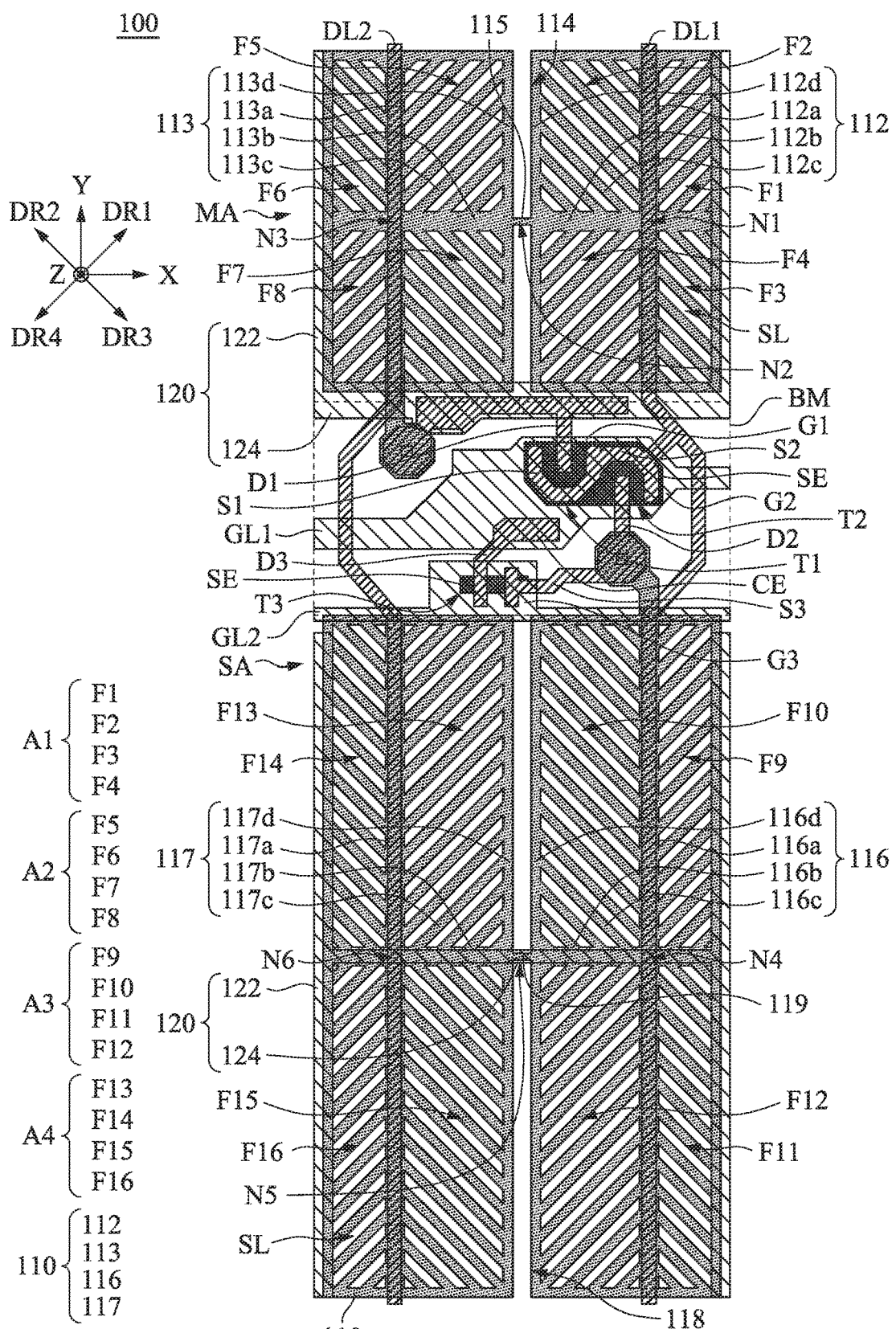
FIG. 3 is a schematic top view of a pixel unit according to another embodiment of the present disclosure.

FIG. 3 is a schematic top view of a pixel unit 100 according to another embodiment of the present disclosure. The present embodiment is similar to the previous embodiments. To be specific, the pixel unit 100 includes a main display area MA and a sub display area SA, and the pixel unit 100 may adopt a circuit configuration with two data lines and one gate line (2D1G) or a configuration with two data lines and half gate line (2GhG), but the scope of the present disclosure is not limited thereto. That is, in the liquid crystal display panel, each pixel unit 100 may be divided into two sub-pixels (i.e., the sub-pixels in the main display area MA and the sub display area SA) disposed on two sides of the gate line GL1, the 2DhG circuit configuration shows the two sub-pixels (i.e., the sub-pixels in the main display area MA and the sub display area SA) are driven by the same gate line and the same data line. Alternatively, the 2D1G circuit configuration shows the two sub-pixels are driven by the same gate line and different data lines. Through the configuration, for the liquid crystal display panel, the color shift at large viewing angle is reduced. Herein, the embodiments of the present are exemplarily illustrated with the 2DhG circuit configuration, but the scope of the present disclosure is not limited thereto.

Reference is made to FIG. 3. The pixel unit 100 includes a gate line GL1, a gate line GL2, a first data line DL1, a second data line DL2, a first active device T1, a second active device T2, a third active device T3, a pixel electrode 110, and a capacitive electrode CE. The pixel electrode 110 is both disposed at the main display area MA and the sub display area SA. The pixel electrode 110 includes a first sub-pixel electrode 112, a second sub-pixel electrode 113, a third sub-pixel electrode 116, and a fourth sub-pixel electrode 117. The sizes of the pixel electrode 110 in the sub display area SA and the main display area MA may optional are different. To be specific, a length of the sub display area SA in the direction substantially parallel with the first data line DL1 or the second data line DL2 is different from that of the main display area MA. That is, a length of the sub display area SA in the second direction (e.g. the direction Y) is different from that of the main display area MA. In other embodiment, the sizes of the pixel electrode 110 in the sub display area SA and the main display area MA may optional substantially the same. Moreover, the voltage potential of the pixel electrode 110 in the sub display area SA and the main display area MA may be different, and the third active device T3 may control the voltage potential of the pixel electrode 110 in the sub display area SA.

The pixel electrode 100 includes the first sub-pixel electrode 112, the second sub-pixel electrode 113, the gap 114, the first connecting electrode 115, the third sub-pixel electrode 116, the fourth sub-pixel electrode 117, the gap 118, and the second connecting electrode 119. The first sub-pixel electrode 112, the second sub-pixel electrode 113, and the first connecting electrode 115 are disposed in the main display area MA. The third sub-pixel electrode 116, the fourth sub-pixel electrode 117 and the second connecting electrode 119 are disposed in the sub display area SA.

To be specific, the first sub-pixel electrode 112 includes a first trunk electrode 112a, a first traverse trunk electrode 112b, and plural first branch electrodes 112c. The first traverse trunk electrode 112b intersects with the first trunk electrode 112a and divides the first sub-pixel electrode 112 into the first region A1. The first branch electrodes 112c are connected with the first trunk electrode 112a or/and the first traverse trunk electrode 112b. Herein, as illustrated in the embodiments of FIG. 1A, the extension directions of the first trunk electrode 112a, the first traverse trunk electrode 112b, and the first branch electrodes 112c approximately form a shape of an eight-pointed star (or namely snow-flake like), but the scope of the present disclosure is not limited thereto.

The second sub-pixel electrode 113 includes a second trunk electrode 113a, a second traverse trunk electrode 113b, and plural second branch electrodes 113c. The second traverse trunk electrode 113b intersects with the second trunk electrode 113a and divides the second sub-pixel electrode 113 to form the second region A2. The second branch electrodes 113c are connected with the second trunk electrode 113a or/and the second traverse trunk electrode 113b. Herein, as illustrated in the embodiments of FIG. 1A, the extension directions of the second trunk electrode 113a, the second traverse trunk electrode 113b, and the second branch electrodes 113c approximately forms a shape of an eight-pointed star (or namely snow-flake like), but the scope of the present disclosure is not limited thereto.

A gap 114 is located between the first sub-pixel electrode 112 and the second sub-pixel electrode 113, the gap 114 may be referred to as first gap 114, and the gap 114 separates the first sub-pixel electrode 112 from the second sub-pixel electrode 113. For example, the gap 114 extends along the second direction (e.g., the direction Y), and the length of the gap 114 is substantially equal to a length of at least one of the first sub-pixel electrode 112 and the second sub-pixel electrode 113 along the second direction (e.g., the direction Y). That is, the length of the gap 114 along the second direction (e.g., the direction Y) is substantially equal to the length of the first sub-pixel electrode 112 along the second direction (e.g., the direction Y) or/and the length of the second sub-pixel electrode 113 along the second direction (e.g., the direction Y). The first connecting electrode 115 is located in the gap 114 and connects the first sub-pixel electrode 112 to the second sub-pixel electrode 113.

The main display area MA may be divided into eight domains, each of the domains F1~F8 has its own direction to aligning the liquid crystal molecules, which is approximately parallel with the extension direction of the branch electrodes. Through the configuration of the first sub-pixel electrode 112 and the second sub-pixel electrode 113 having shapes of eight-pointed star (or namely snow-flake like), the strength of disclination of the node N2 is limited. Other related details are substantially the same as the details illustrated in previous embodiments, and thereto omitted herein.

The third sub-pixel electrode 116 includes a third trunk electrode 116a, a third traverse trunk electrode (or namely third horizontal trunk electrode) 116b, and plural third branch electrodes 116c. The third trunk electrode 116a extends along substantially the same direction as that of the first data line DL1 and at least one portion of the third trunk electrode 116a is overlapped with the first data line DL1 in a vertical projection direction. The third traverse trunk electrode 116b intersects with the third trunk electrode 116a and divides the third sub-pixel electrode 116 to form the third region A3. The third region A3 includes a ninth domain F9, a tenth domain F10, an eleventh domain F11, and a twelfth domain F12. To be specific, the extension directions of the third trunk electrode 116a and the third traverse trunk electrode 116b are substantially orthogonal to each other, but the scope of the present disclosure is not limited thereto. The third branch electrodes 116c are connected with the third trunk electrode 116a or/and the third traverse trunk electrode 116b. For example, as shown in the figure, the third branch electrodes 116c in the ninth domain F9 extend toward the first extension direction DR1, the third branch electrodes 116c in the tenth domain F10 extend toward the second extension direction DR2, the third branch electrodes 116c in the eleventh domain F11 extend toward the third extension direction DR3, and the third branch electrodes 116c in the twelfth domain F12 extend toward the fourth extension direction DR4. Herein, the extension directions of the third trunk electrode 116a, the third traverse trunk electrode 116b, and the third branch electrodes 116c approximately forms a shape of an eight-pointed star (or namely snow-flake like), but the scope of the present disclosure is not limited thereto.

The fourth sub-pixel electrode 117 includes a fourth trunk electrode 117a, a fourth traverse trunk electrode (or namely fourth horizontal trunk electrode) 117b, and plural fourth branch electrodes 117c. The fourth trunk electrode 117a extends along substantially the same direction as that of the second data line DL2 and at least one portion of the fourth trunk electrode 117a is overlapped with the second data line DL2 in a vertical projection direction. The fourth traverse trunk electrode 117b intersects with the fourth trunk electrode 117a and divides the fourth sub-pixel electrode 117 to form the fourth region A4. The fourth region A4 includes a thirteenth domain F13, a fourteenth domain F14, a fifteenth domain F15, and a sixteenth domain F16. To be specific, the extension directions of the fourth trunk electrode 117a and the fourth traverse trunk electrode 117b are substantially orthogonal to each other, but the scope of the present disclosure is not limited thereto. The fourth branch electrodes 117c are connected with the fourth trunk electrode 117a or/and the fourth traverse trunk electrode 117b. For example, as shown in the figure, the fourth branch electrodes 117c in the thirteenth domain F13 extend toward the first extension direction DR1, the fourth branch electrodes 117c in the fourteenth domain F14 extend toward the second extension direction DR2, the fourth branch electrodes 117c in the fifteenth domain F15 extend toward the third extension direction DR3, and the fourth branch electrodes 117c in the sixteenth domain F16 extend toward the fourth extension direction DR4. Herein, the extension directions of the fourth trunk electrode 117a, the fourth traverse trunk electrode 117b, and the fourth branch electrodes 117c approximately forms a shape of an eight-pointed star (or namely snow-flake like), but the scope of the present disclosure is not limited thereto.

The gap 118 is located between third sub-pixel electrode 116 and the fourth sub-pixel electrode 117, the gap 118 may be referred to as second gap 118, and the gap 118 separates the third sub-pixel electrode 116 from the fourth sub-pixel electrode 117. For example, the gap 118 extends along the second direction (e.g., the direction Y), and the length of the gap 118 is substantially equal to a length of at least one of the third sub-pixel electrode 116 and the fourth sub-pixel electrode 117 along the second direction (e.g. the direction Y). That is, the length of the gap 118 along the second direction (e.g., the direction Y) is substantially equal to the length of the third sub-pixel electrode 116 along the second direction (e.g., the direction Y) or/and the length of the fourth sub-pixel electrode 117 along the second direction (e.g., the direction Y). In the embodiments, the length of the gap 118 along (or namely in) the second direction in the sub display area SA is greater than the length of the gap 114 along (or namely in) the second direction in the main display area MA, but it should not limit the scope of the present disclosure. In other embodiments, the length of the gap 118 along the second direction in the sub display area SA is substantially equal to the length of the gap 114 along the second direction in the main display area MA. The second connecting electrode 119 is located in the gap 118 and connects the third sub-pixel electrode 116 to the fourth sub-pixel electrode 117. In the present embodiments, the second connecting electrode 119 connects the third traverse trunk electrode 116b of the third sub-pixel electrode 116 to the fourth traverse trunk electrode 117b of the fourth sub-pixel electrode 117, but the scope of the present disclosure is not limited thereto. In other embodiments, the second connecting electrode 119 may connect other portions of the third sub-pixel electrode 116 to other portions of the fourth sub-pixel electrode 117 to establish electrical connections. In some embodiments of the present disclosure, the width of the second connecting electrode 119, for example, along (or namely in) the second direction Y, is smaller than the width of at least one of the third traverse trunk electrode 116b and the fourth traverse trunk electrode 117b, for example, along (or namely in) the second direction Y.

Through the configuration, the sub display area SA includes the third region A3 and the fourth region A4. The liquid crystal molecules in the domains F9~F16 respectively have their own orientations, which are substantially parallel with the extension directions of the branch electrodes. In the third region A3 and the fourth region A4, the nodes N4~N6 are respectively located at the intersection of the third trunk electrode 116a and the third traverse trunk electrode 116b, the intersection of the gap 118 and the second connecting electrode 119, and the intersection of the fourth trunk electrode 117a and the fourth traverse trunk electrode 117b. Through the configuration, as the aforementioned node N2, the strength of disclination of the node N5 is also −1. The liquid crystal adjacent to the node N5 having the strength of disclination of −1 tends to be less distorted, and the disclination lines adjacent to the node is narrower, so as to provide good display effect without needing to shield the node N5 with another shielding element (e.g., a shielding electrode, a data line, or a black matrix). As aforementioned, the two electrodes with shapes of an eight-pointed star (or namely snow-flake like) are adopted, and the nodes N2 and N5 have the strength of disclination of −1, thereby prevent the distortion of the orientation of liquid crystal molecules. In addition, the node N4 is similar to the node N1, the node N6 is similar to the nodes N3, and the details of the nodes N4 and N6 may be found in previous descriptions.

In some embodiments, the width of the first connecting electrode 115, for example, along (or namely in) the second direction Y, is not greater than the width of at least one of the first traverse trunk electrode 112b and the second traverse trunk electrode 113b, for example, along (or namely in) the second direction Y. In some embodiments, the width of the second connecting electrode 119, for example, along (or namely in) the second direction Y, is not greater than or is smaller than the width of at least one of the third traverse trunk electrode 116b and the fourth traverse trunk electrode 117b, for example, along (or namely in) the second direction Y. Through the configuration, the position of the nodes N2 and N5 is limited and the strengths of disclination is limited to be −1, which prevent the disclination lines form being distorted.

As shown by the configuration of the pixel electrode 110 shown in the main area MA, a slit SL is located between every two adjacent third branch electrodes 116c, and a slit SL is located between every two adjacent fourth branch electrodes 117c. Liquid crystal molecules may be tilted in the slits SL, thereby realizing the configuration of multi-domain alignment.

Reference is made to FIG. 1A and FIG. 1B. In the embodiments of the present disclosure, the width P of the gap 114 may be greater than the width L1 of one of the slits SL, and the width P of the gap 114 is smaller than a sum of the width L1 (or the width L1') of one of the slits SL and the width L2 of one of the first branch electrodes 112c or a sum of the width L1' of one of the slits SL and the width L2' of one of the second branch electrodes 113c. Through the configuration, the orientations of liquid crystal molecules adjacent to the gap 114 is confined effectively, thereby keeping the liquid crystal efficiency near the gap 114 to be well when a voltage is applied. Similarly, the width of the gap 118 may be greater than the width of the slits SL, and the width of the gap 118 is smaller than a combination of the width of one of the slits SL and the width of one of the third branch electrodes 116c or sum of the width of one of the slits SL and the width of one of the fourth branch electrode 117c. Of course, it should not limit the scope of the present disclosure, in other embodiments, the gap 114 and the gap 118 may be configured to have sufficient widths.

In some embodiments of the present disclosure, the sizes of the first branch electrodes 112c respectively disposed on two opposite sides of the first trunk electrode 112a are different. For example, the size of the first domain F1 is different from the size of the second domain F2. Similarly, the second sub-pixel electrode 113, the third sub-pixel electrode 116, and the fourth sub-pixel electrode 117 may be configured in this way. This kind of asymmetric structure helps liquid crystal molecules be tilted, and therefore further enhances the order of the liquid crystal molecules.

For example, along a vertical projection direction (e.g., the direction Z), the first sub-pixel electrode 112 has a first projection shape (i.e., similar to the shape formed by connecting the outer edges or rims of the first sub-pixel electrode 112 shown in FIG. 1A), and the first projection shape has a first dividing region substantially parallel with the second direction (e.g., the direction Y). The first dividing region may be referred to a region or line dividing the first projection shape into two portions that are substantially symmetric or have even lengths. For example, the two portions on two opposite sides of the first dividing region have substantially the same shape and area, and the first trunk electrode 112a is not overlapped with at least a portion of the first dividing region. Similarly, the second sub-pixel electrode 113 is also designed in this way, and the sizes of the second branch electrodes 113c respectively disposed on and connected to two opposite sides of the second trunk electrode 113a are different. For example, along (or namely in) a vertical projection direction (e.g., the direction Z), the second sub-pixel electrode 113 has a second projection shape (i.e., similar to the shape formed by connecting the outer edges or rims of the second sub-pixel electrode 113 shown in FIG. 1A), and the second projection shape has a second dividing region substantially parallel with the second direction (e.g., the direction Y). The second dividing region may be referred to a region or line dividing the second projection shape into two portions that are substantially symmetric or have even lengths. For example, the two portions on two opposite sides of the second dividing region have substantially the same shape and area, and the second trunk electrode 113a is not overlapped with at least a portion of the second dividing region.

Herein, the widths of the first trunk electrode 112a and the third trunk electrode 116a may be greater than the width L4 of the first data line DL1, and the widths of the second trunk electrode 113a and the fourth trunk electrode 117a may be greater than the width L4' of the second data line DL2. Through the configuration, the first data line DL1 is shielded by the first trunk electrode 112a and the third trunk electrode 116a, the second data line DL2 is shielded by the second trunk electrode 113a and the fourth trunk electrode 117a, thereby in the process of display image, when a voltage is applied, the first data line DL1 or the second data line DL2 is prevented from generating a strong electric field which may result in problems, such as a light leakage at a dark state or a crosstalk.

In some embodiments of the present disclosure, the first sub-pixel electrode 112 includes a first fringe electrode 112d connected with ends of the first branch electrodes 112c. For example, the first fringe electrode 112d is connected with ends of all the first branch electrodes 112c or ends of part of the first branch electrodes 112c so as to form plural segments. Through the configuration, it prevents the unstably distortion of the orientation of liquid crystal molecules due to the variance of the voltage potentials of the ends of the first branch electrode 112c. Similarly, the second sub-pixel electrode 113, the third sub-pixel electrode 116, and the fourth sub-pixel electrode 117 may be configured in this way. The second sub-pixel electrode 113, the third sub-pixel electrode 116, and the fourth sub-pixel electrode 117 respectively include the second fringe electrode 113d, the third fringe electrode 116d, and the fourth fringe electrode 117d, which are respectively connected to ends of the second branch electrodes 113c, ends of the third branch electrodes 116c, and ends of the fourth branch electrodes 117c.

Other details of the third sub-pixel electrode 116 and the fourth sub-pixel electrode 117 are substantially the same as that of the first sub-pixel electrode 112 and the second sub-pixel electrode 113, and omitted herein.

In some embodiments of the present disclosure, the first active device T1 is electrically connected with the pixel electrode 110 in the main display area MA, and the second active device T2 is electrically connected with the pixel electrode 110 in the sub display area SA. However, it should not limit the scope of the present disclosure, in other embodiments, the first active device T1 may be electrically connected with the pixel electrode 110 in the sub display area SA, and the second active device T2 may be connected with the pixel electrode 110 in the main display area MA.

The first active device T1 is electrically connected with the gate line GL1, the first data line DL1, and the pixel electrode 110 in the main display area MA. To be specific, the gate electrode G1 of the first active device T1 is electrically connected with the gate line GL1, the source electrode S1 and the drain electrode D1 are respectively connected with the first data line DL1 and the pixel electrode 110 in the main display area MA, so that the first active device T1 may connect the pixel electrode 110 in the main display area MA to the first data line DL under the control of the gate line GL1.

The second active device T2 is electrically connected with the gate line GL1, the data line DL1, and the pixel electrode 110 in the sub display area SA. To be specific, the gate electrode G2 of the second active device T2 is electrically connected with the gate line GL1, and the source electrode S2 and the drain electrode D2 are respectively connected to the first data line DL1 and the pixel electrode 110 in the sub display area SA, so that the second active device T2 may electrically connect the pixel electrode 110 in the sub display area SA to the first data line DL under the control of the gate line GL1. Herein, the second active device T2 is electrically connected with the first active device T1. To be specific, the gate electrode G2 is electrically connected with the gate electrode G1, and the source electrode S1 is electrically connected with the source electrode S2.

The third active device T3 is electrically connected with a gate line GL2, a capacitive electrode CE, and the pixel electrode 110. To be specific, a gate electrode G3 of the third active device T3 is electrically connected with a gate line GL2, a source electrode S3 and a drain electrode D3 are respectively electrically connected with the pixel electrode 110 in the sub display area SA and the capacitive electrode CE. Through the configuration, the third active device T3 may electrically connect the pixel electrode 110 in the sub display area SA to the capacitive electrode CE under the control of the gate line GL2.

Herein, the capacitive electrode CE is at least partially overlapped with the gate line GL1, and the capacitive electrode CE and the gate line GL1 are separated from each other by a capacitive dielectric layer. For example, the gate dielectric layer GI may be taken as the capacitive dielectric layer of the capacitive element. Through the configuration, the capacitive electrode CE, the gate line GL1, and the capacitive dielectric layer (not shown) form the capacitive element. Accordingly, after the pixel electrode 110 in the main display area MA and the pixel electrode 110 in the sub display area SA are connected to the first data line DL1 and have similar potentials by the first active device T1 and the second active device T2 under the control of the gate line GL1, the capacitive electrode CE of the capacitive element CA is electrically connected with pixel electrode 110 in the sub display area SA by the third active device T3 under the control of the gate line GL2, so that the potential of the pixel electrode 110 in the sub display area SA becomes lower than the potential of the pixel electrode 110 in the main display area MA.

In other words, in the present embodiments, in the process of driving one single pixel structure, the first sub-pixel electrode and the second sub-pixel electrode have a voltage potential different from that of the third sub-pixel electrode and the fourth sub-pixel electrode. Therefore, the display medium corresponding to various domains are driven by different voltage potentials respectively, so as to realize a configuration of multi-domain alignment and improve the phenomenon of color washout. In these embodiments, the third active device T3 shares the voltage potentials of some of the sub-pixel electrodes under the control of the second gate line GL2, so that the first sub-pixel electrode 112 and the second sub-pixel electrode 113 has different voltage potentials in the driving process, thereby reducing the color shift of the display.

However, in other embodiments, the third active device T3, the gate line GL2, and the capacitive electrode CE may be omitted, and other designs may be adopted such that the display medium in the main display area MA and the sub display area SA may apply different voltage potential, thereby reducing the color shift of the display.

Figure 4:
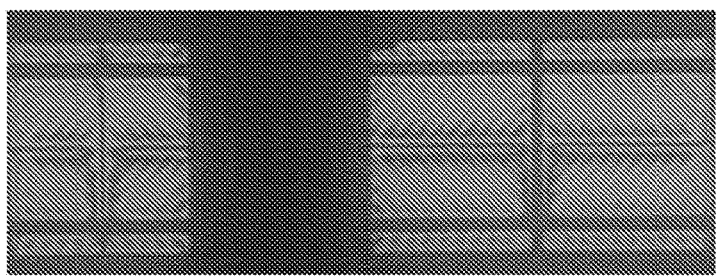
FIG. 4 shows display images of the pixel unit of FIG. 3 taken by an optical microscope.
Figure 4:
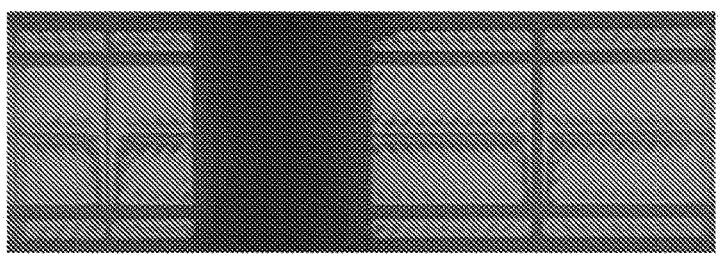
Figure 4:
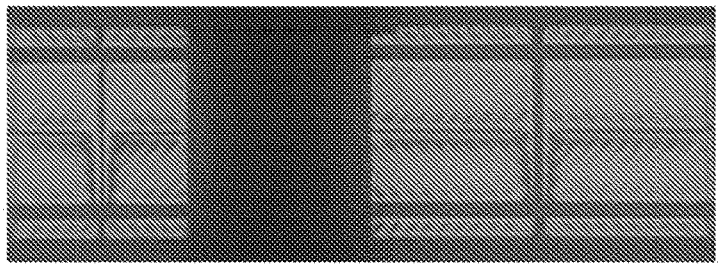
Figure 4:
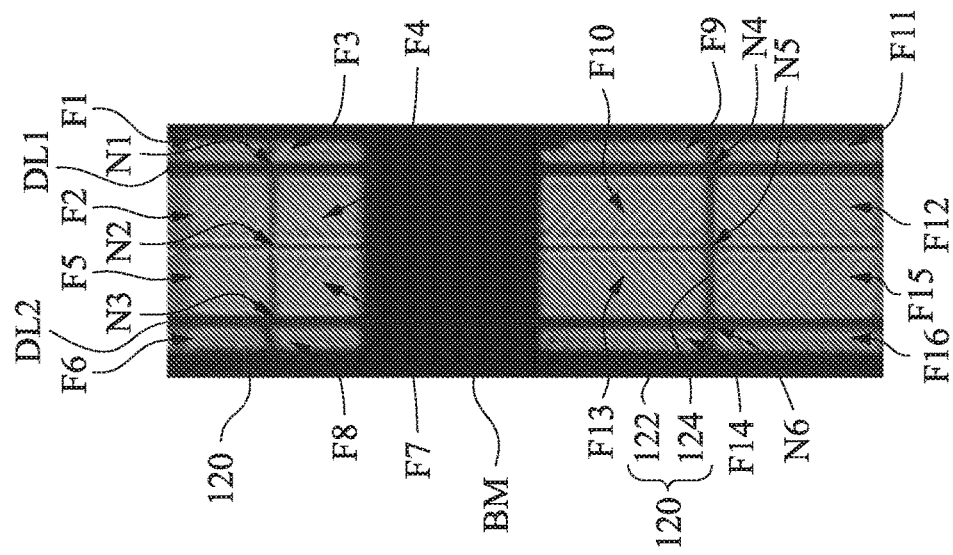

FIG. 4 shows display images of the pixel unit 100 of FIG. 3 taken by an optical microscope, in which No. 1, No. 2, No. 3, and No. 4 represent the pixel units that have different design parameters, which are related to the configurations of the first sub-pixel electrode 112, the second sub-pixel elec-trode 113, the third sub-pixel electrode 116, and the fourth sub-pixel electrode 117. Referring to FIG. 1B, FIG. 3, and FIG. 4, for better showing and comparing the performance of the various pixel units, the design parameters and the liquid crystal efficiency of the pixel units are recited as follows:

|  | No. | | | |
| --- | --- | --- | --- | --- |
|  | 1 | 2 | 3 | 4 |
| The widths L2, L2' of the branch electrodes (unit: um) | 3.5 | 2.5 | 3 | 3 |
| The widths L1, L1' of the slits (unit: um) | 2.5 | 3.5 | 3 | 3 |
| The width P of the gap (unit: um) | 4 | 4 | 3 | 2.5 |
| Liquid crystal efficiency (%) | 34.91 | 27.98 | 25.33 | 25.01 |

In the above table, when the width P of the gap 114 or the gap 118 is too small, it is easy for the node to move or vanish, resulting in disclination lines. As shown by the No. 1, if the width P of at least one of the gap 114 and the gap 118 is greater than the width L1 (or L1') of the slits SL, the phenomenon of dark fringes which results from the unstable-oriented liquid crystal molecules is less easy to occur. However, if the width P of the gap 114 or the gap 118 is too large, the electric field may not be uniform, and the liquid crystal molecules may be reoriented irregularly. Therefore, the width P of the gap 114 or the gap 118 is designed to be greater than the width L1 (or L1') of the slits SL and smaller than a sum of the width L1 (or L1') of one of the slits SL and the width L2 (or L2') of one of the branches, and therefore improving the liquid crystal efficiency and display effect.

Reference is made to FIG. 3 and FIG. 4. In some embodiments, the shielding electrodes 120 are respectively disposed in the main display area MA and the sub display area SA. The shielding electrodes 120 may include two trunk shielding electrodes 122 and a horizontal shielding electrode (or namely traverse shielding electrode) 124 connecting the trunk shielding electrodes 122. The extension directions of the trunk shielding electrodes 122 are substantially parallel with the extension direction of the first data line DL1. The trunk shielding electrodes 122 covers the connecting region (or namely portion) of the first color-filter region 132 and the second color-filter region 134 and the connecting region (or namely portion) of the second color-filter region 134 and the third color-filter region 136, thereby reducing the possibility of light blending and light leakage in dark state. The extension direction of the horizontal shielding electrodes 124 is substantially parallel with the extension direction of the first traverse trunk electrode 112b or the third traverse trunk electrode 116b.

In the main display area MA, the horizontal shielding electrodes 124 are located at the bottom edge of the main display area MA. In the sub display area SA, the horizontal shielding electrodes 124 may be configured to be overlapped with the third traverse trunk electrode 116b, the fourth traverse trunk electrode 117b, and the second connecting electrode 119. A width of the horizontal shielding electrodes 124 may be greater than a width of the second connecting electrode 119, thereby shielding the aforementioned node N5, but the scope of the present disclosure is not limited thereto.

In other embodiments, in the sub display area SA, the horizontal shielding electrodes 124 are located at the bottom edge of the sub display area SA, and do not shield the node N5. In other embodiments, in the main display area MA, the horizontal shielding electrodes 124 overlaps with the first connecting electrode 115, and therefore shields the node N2.

Figure 5:
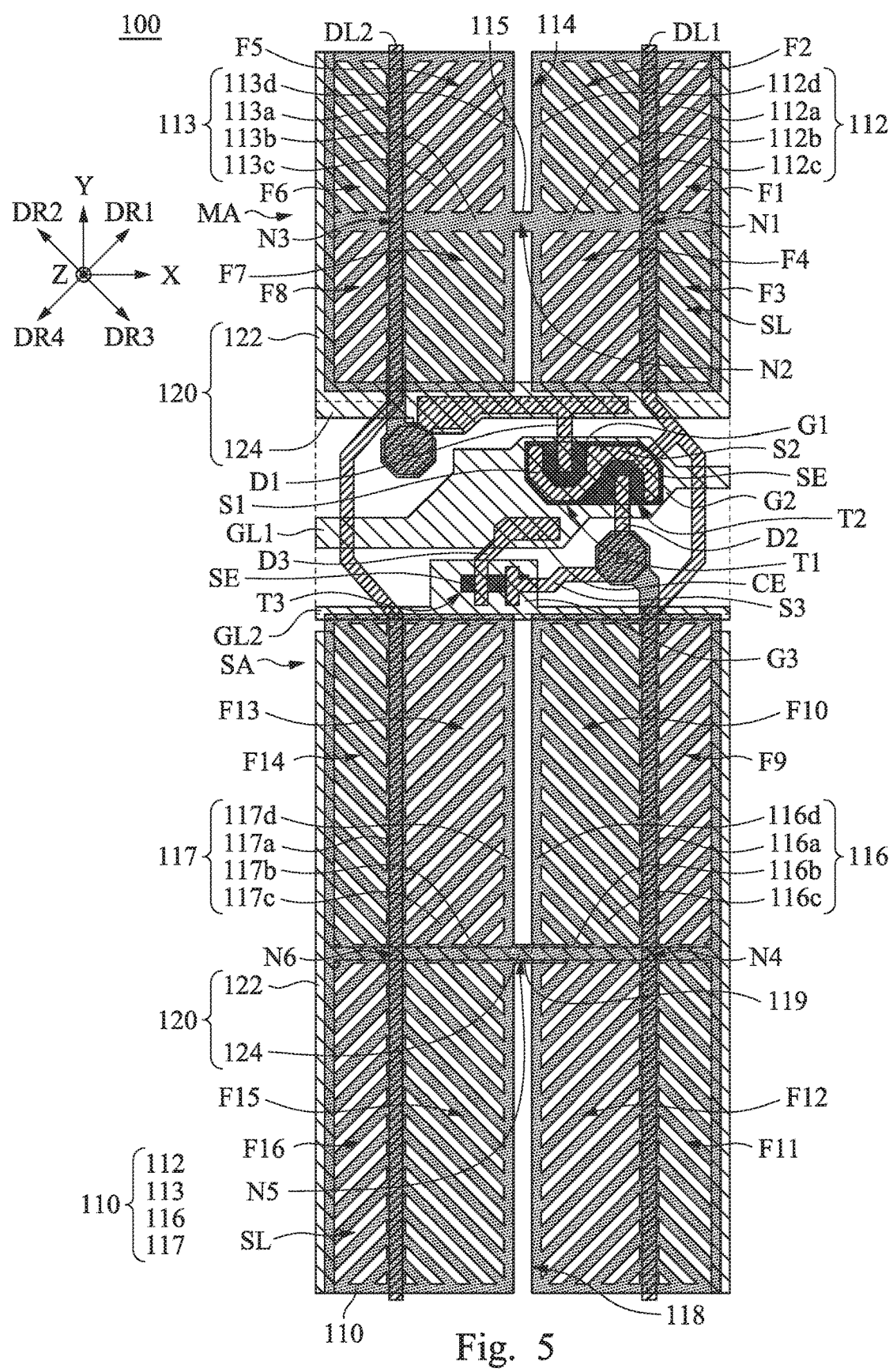
FIG. 5 is a schematic top view of a pixel unit according to another embodiment of the present disclosure.

FIG. 5 is a schematic top view of a pixel unit 100 according to another embodiment of the present disclosure. The present embodiment is similar to the previous embodiments, and the difference is that: in the present embodiments, the width of the first connecting electrode 115 on the vertical direction Y is substantially equal to the width of one of the first traverse trunk electrode 112b and the second traverse trunk electrode 113b on the vertical direction Y, and the width of the second connecting electrode 119 on the vertical direction Y is substantially equal to the width of one of the third traverse trunk electrode 116b and the fourth traverse trunk electrode 117b on the vertical direction Y.

Other details of the present disclosure are similar to those mentioned above, and not repeated herein.

Figure 6:
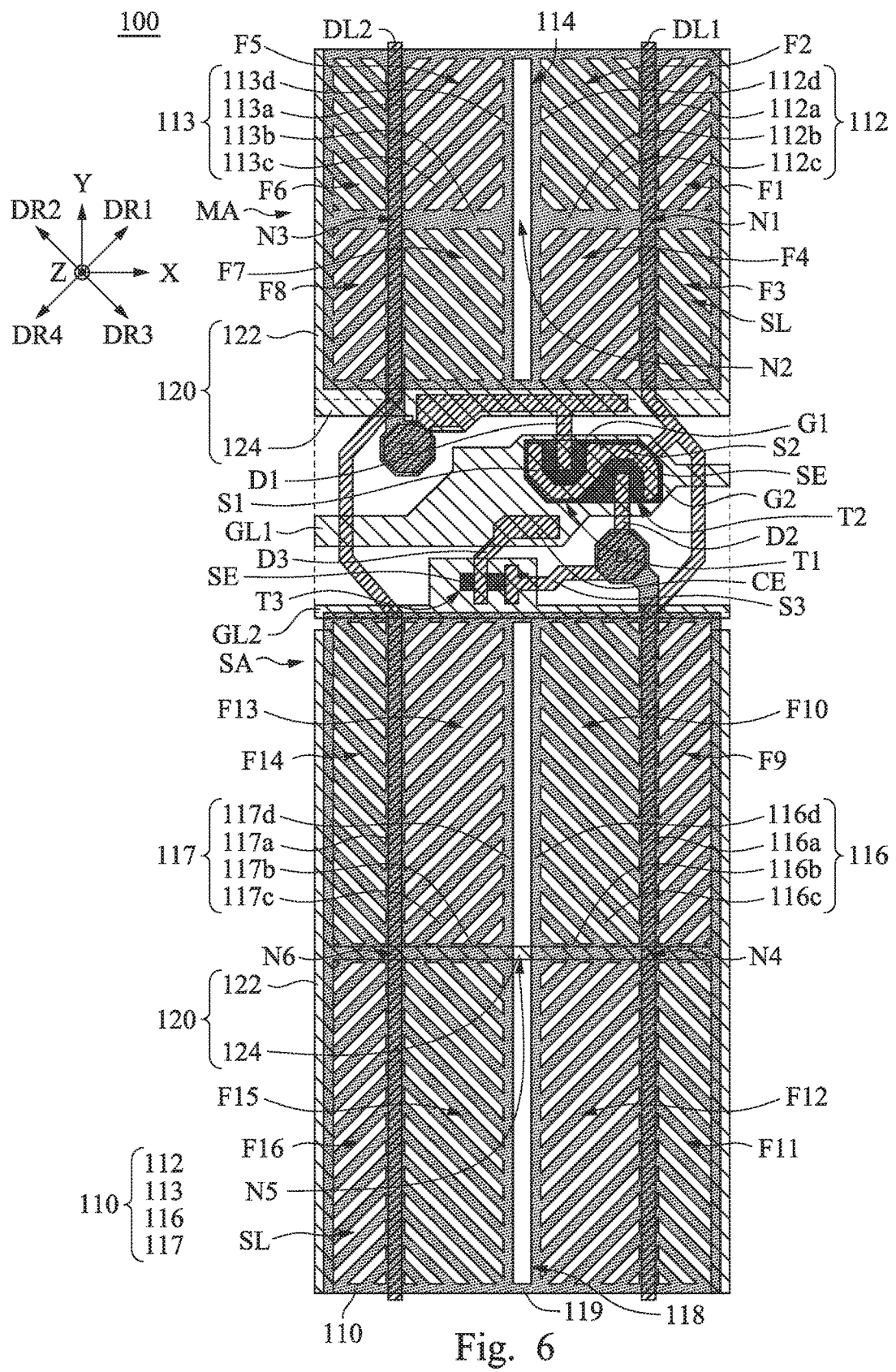
FIG. 6 is a schematic top view of a pixel unit according to another embodiment of the present disclosure.

FIG. 6 is a schematic top view of a pixel unit 100 according to another embodiment of the present disclosure. The present embodiment is similar to the previous embodiments, and the difference is that: in the present embodiments, the first connecting electrode 115 connect the first fringe electrode 112d of the first sub-pixel electrode 112 and the second fringe electrode 113d of the second sub-pixel electrode 113, instead of connecting the first traverse trunk electrode 112b and the second traverse trunk electrode 113b. The second connecting electrode 119 connects the third fringe electrode 116d of the third sub-pixel electrode 116 and the fourth fringe electrode 117d of the fourth sub-pixel electrode 117, instead of connecting the third traverse trunk electrode 116b and the fourth traverse trunk electrode 117b.

To be specific, the first connecting electrode 115 connect the first fringe electrode 112d which is substantially parallel with the first traverse trunk electrode 112b and the second fringe electrode 113d which is substantially parallel with the second traverse trunk electrode 113b. The second connecting electrode 119 connects the third fringe electrode 116d which is substantially parallel with the third traverse trunk electrode 116b and the fourth fringe electrode 117d which is substantially parallel with the fourth traverse trunk electrode 117b.

Other details of the present disclosure are similar to those mentioned above, and not repeated herein.

Figure 7:
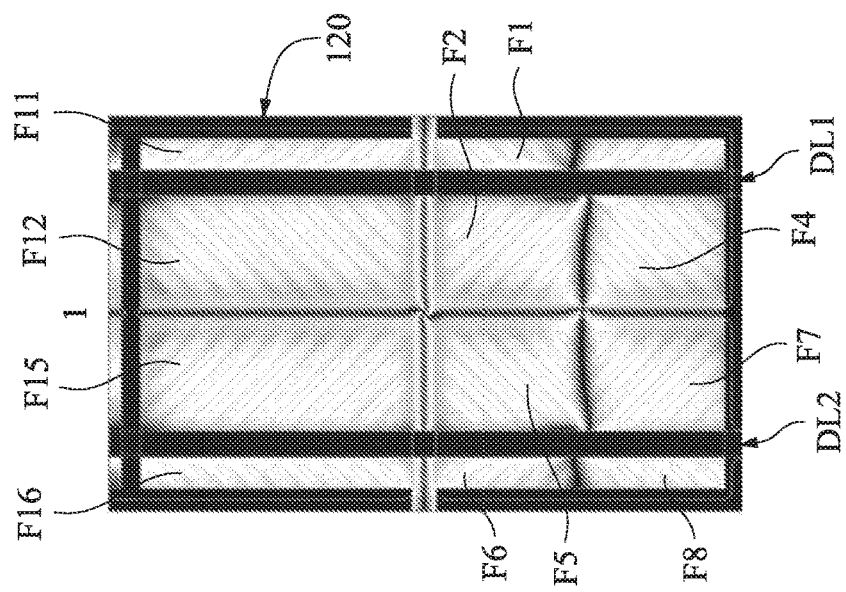
FIG. 7 shows optical simulation views of pixel units according to some embodiment of the present disclosure.
Figure 7:
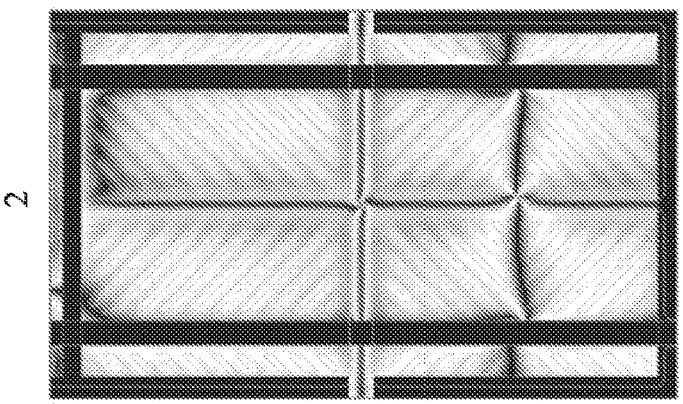
Figure 7:
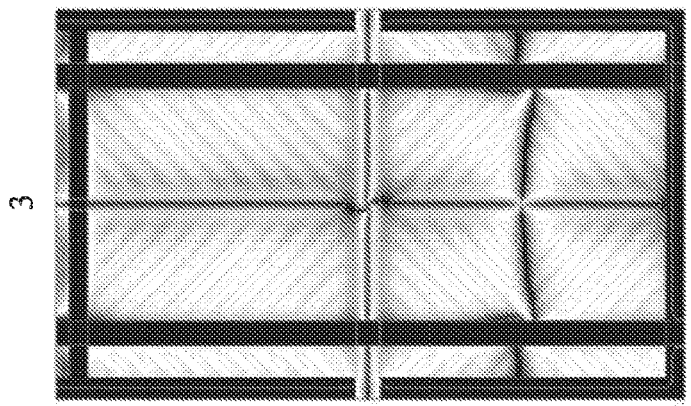

In FIG. 7, labels 1, 2, and 3 respectively indicate the optical simulation views of pixel units 100 according to the embodiments of FIGS. 3, 5, and 6. Herein, FIG. 7 shows optical simulation views of the main display area MA and a portion of the sub display area SA of two adjacent pixel units 100 according to some embodiment of the present disclosure, in which the upper half portion is half of the sub display area SA of a first one of the pixel units, and the lower half portion is the main display area MA of a second one of the pixel units adjacent to the first one.

Reference is made to FIGS. 3, 5, 6, and 7. For comparing the performance of the various pixel units 100, the specifications of the embodiments and transmittances of the various pixel units 100 in FIG. 7 are shown in the following table:

|  | Label | | |
| --- | --- | --- | --- |
|  | 1 | 2 | 3 |
| Embodiments | FIG. 3 | FIG. 5 | FIG. 6 |
| Positions of the connecting electrodes | Middle of the main display area MA( or the sub display area SA) | Middle of the main display area MA(or the sub display area SA) | Edge of the main display area MA(or the sub display area SA) |
| A ratio of a width of the connecting electrodes to a width of the horizontal trunk electrodes | smaller than 1 | equal to about 1 | smaller than 1 |
| Transmittance | 27.3% | 26.3% | 25.9% |
| Normalized transmittance | 100% | 95.6% | 95.0% |

Accordingly, from FIG. 7 and the above table, it is believed that the configuration of the embodiments of FIG. 3 enhances the transmittance of the pixel unit as shown by the label 1. To be specific, it enhances the transmittance of the pixel unit that the first connecting electrode 115 is disposed between the first traverse trunk electrode 112b and the second traverse electrode 113b in the main display area MA, the second connecting electrode 119 is disposed between the third traverse electrode 116b and the fourth traverse electrode 117b in the sub display area SA, and the widths of the first connecting electrode 115 and the second connecting electrode 119 along the vertical direction Y are designed to be smaller than the widths of the first traverse trunk electrode 112b, the second traverse electrode 113b, the third traverse electrode 116b, and the fourth traverse electrode 117b.

Figure 8:
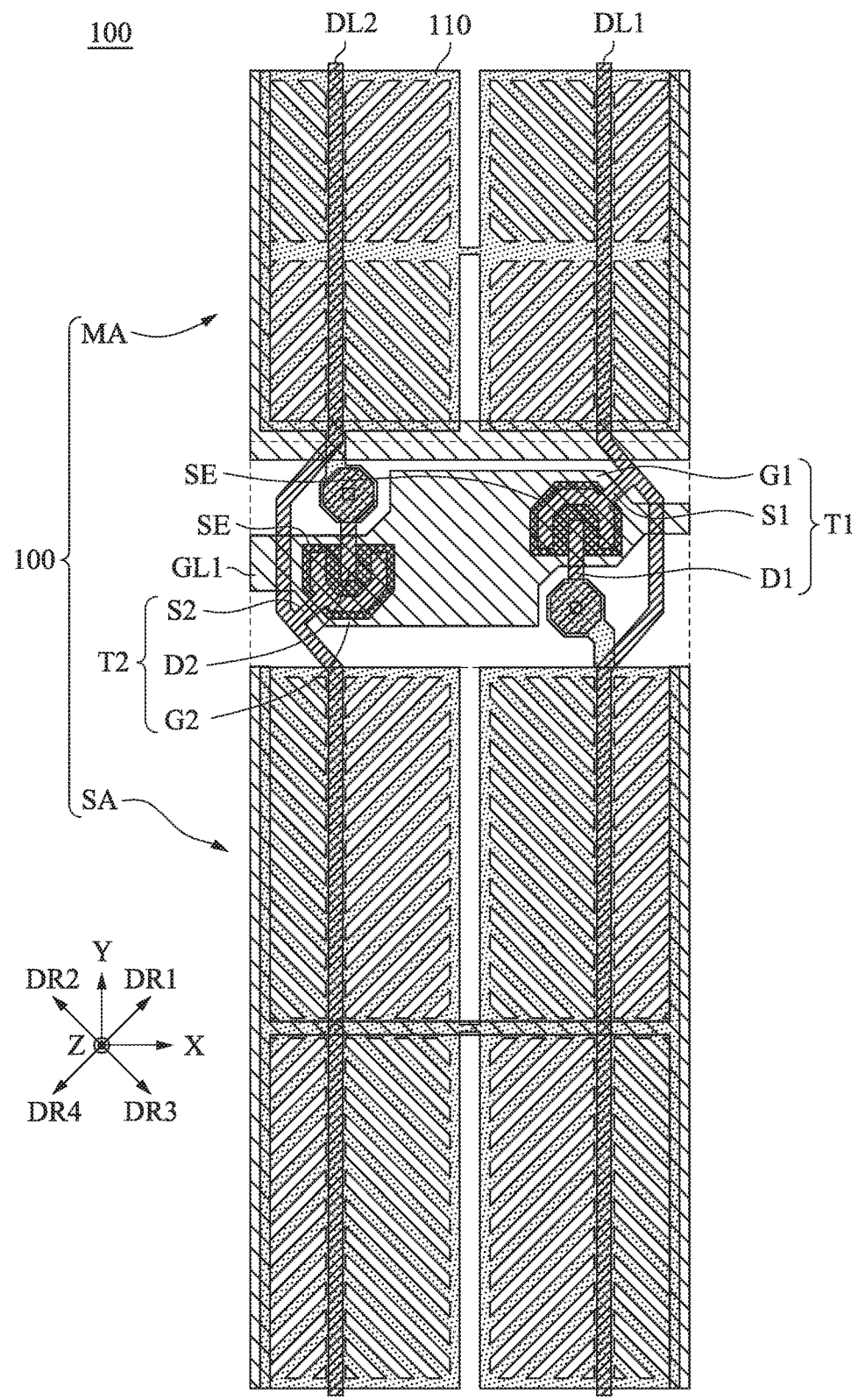
FIG. 8 is a schematic top view of a pixel unit according to another embodiment of the present disclosure.

FIG. 8 is a schematic top view of a pixel unit 100 according to another embodiment of the present disclosure. The present embodiment is similar to the previous embodiments, and the difference is that: in the present embodiments, the pixel unit 100 is configured with a circuit of two data lines and one gate line (2D1G). In the liquid crystal display panel, each pixel unit 100 may be divided into a sub-pixel in the main display area MA and a sub-pixel in the sub display area SA, and the pixel electrode 110 in the main display area MA and the pixel electrode 110 in the sub display area SA are driven by the same first gate line G1 and different data lines (which are the first data line DL1 and the second data line DL2 respectively).

Herein, the gate electrode G1 of the first active device T1 is electrically connected with the gate line GL1, the source electrode S1 and the drain electrode D1 are respectively connected with the first data line DL1 and the pixel electrode 110 in the main display area MA, so that the first active device T1 may connect the pixel electrode 110 in the main display area MA to the first data line DL under the control of the gate line GL1.

The gate electrode G2 of the second active device T2 is electrically connected with the gate line GL1, and the source electrode S2 and the drain electrode D2 are respectively connected to the second data line DL2 and the pixel electrode 110 in the sub display area SA, so that the second active device T2 may connect the pixel electrode 110 in the sub display area SA to the second data line DL2 under the control of the gate line GL1.

Through the configuration, for the liquid crystal display panel, the color shift at large viewing angle is reduced. Other related details are substantially the same as the details illustrated in previous embodiments, and thereto omitted herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pixel unit, comprising:
   a gate line extending along a first direction;
   a first data line and a second data line extending along a second direction intersecting with the first direction;
   a first active device electrically connected with the gate line and the first or second data line; and
   at least one pixel electrode electrically connected with the first active device, wherein the pixel electrode comprises:
   a first sub-pixel electrode comprising a first trunk electrode, a first traverse trunk electrode, and a plurality of first branch electrodes, wherein the first trunk electrode extends along substantially the same direction as that of the first data line, and at least one portion of the first trunk electrode is overlapped with the first data line in a vertical projection direction, the first traverse trunk electrode intersects with the first trunk electrode so as to divide the first sub-pixel electrode to form a first region, and the first branch electrodes is connected with the first trunk electrode and/or the first traverse trunk electrode;
   a second sub-pixel electrode comprising a second trunk electrode, a second traverse trunk electrode, and a plurality of second branch electrodes, wherein the second trunk electrode extends along substantially the same direction as that of the second data line and at least one portion of the second trunk electrode is overlapped with the second data line in the vertical projection direction, the second traverse trunk electrode intersects with the second trunk electrode so as to divide the second sub-pixel electrode to form a second region, and the second branch electrodes is connected with the second trunk electrode and/or the second traverse trunk electrode, wherein the first direction, the second direction, and the vertical projection direction are different, a gap is located between the first sub-pixel electrode and the second sub-pixel electrode, and the gap separates the first sub-pixel electrode from the second sub-pixel electrode; and
   at least one first connecting electrode located in the gap and connecting the first sub-pixel electrode to the second sub-pixel electrode.

2. The pixel unit of claim 1, wherein a width of the first connecting electrode along the second direction is not greater than a width of at least one of the first traverse trunk electrode and the second traverse trunk electrode along the second direction.

3. The pixel unit of claim 1, wherein the first connecting electrode is connected with at least one of the first traverse trunk electrode of the first sub-pixel electrode and the second traverse trunk electrode of the second sub-pixel electrode.

4. The pixel unit of claim 1, wherein the first region comprises:
   a first domain, a second domain, a third domain, and a fourth domain, wherein the first branch electrodes in the first domain extend along a first extension direction, the first branch electrodes in the second domain extend along a second extension direction, the first branch electrodes in the third domain extend along a third extension direction, and the first branch electrodes in the fourth domain extend along a fourth extension direction, and
   the second region comprises:
   a fifth domain, a sixth domain, a seventh domain, and an eighth domain, wherein the second branch electrodes in the fifth domain extend along the first extension direction, the second branch electrodes in the sixth domain extend along the second extension direction, the second branch electrodes in the seventh domain extend along the third extension direction, and the second branch electrodes in the eighth domain extend along the fourth extension direction.

5. The pixel unit of claim 1, further comprising a main display area and a sub display area disposed on two sides of the gate line, wherein a plurality of the pixel electrodes are respectively located in the main display area and the sub display area; the pixel unit further comprising a second active device, wherein the first active device is connected with one of the pixel electrodes in the main display area and the sub display area, and the second active device is connected with another one of the pixel electrodes in the main display area and the sub display area.

6. The pixel unit of claim 1, wherein a width of the first data line along the first direction is smaller than a width of the first trunk electrode along the first direction.

7. The pixel unit of claim 1, wherein a slit is located between every adjacent two of the first branch electrodes, and a width of the slit is smaller than or substantially equal to a width of one of the first branch electrodes.

8. The pixel unit of claim 7, wherein a width of the gap along the first direction is greater than the width of the slit, and the width of the gap along the first direction is smaller than a sum of the width of the slit and the width of one of the first branch electrodes.

9. The pixel unit of claim 1, wherein lengths of the first branch electrodes disposed on two sides of the first trunk electrode are different.

10. The pixel unit of claim 1, wherein the first sub-pixel electrode has a first projection shape on the vertical projection direction, the first projection shape has a first dividing region dividing the first projection shape into two first symmetric portions and substantially parallel with the second direction, and the first trunk electrode is not overlapped with at least one portion of the first dividing region.

11. The pixel unit of claim 10, wherein the second sub-pixel electrode has a second projection shape on the vertical projection direction, the second projection shape has a second dividing region dividing the second projection shape into two second symmetric portions and substantially parallel with the second direction, and the second trunk electrode is not overlapped with at least one portion of the second dividing region.

12. The pixel unit of claim 1, wherein the gap extends substantially along the second direction, and a length of the gap is substantially equal to a length of at least one of the first sub-pixel electrode and the second sub-pixel electrode along the second direction.

13. The pixel unit of claim 1, wherein the pixel electrode has a projection shape on the vertical projection direction, the projection shape has a dividing region substantially parallel with the second direction, and the gap is overlapped with at least one portion of the dividing region.

14. The pixel unit of claim 1, wherein the first sub-pixel electrode comprises a first fringe electrode connected with ends of the first branch electrodes.

15. The pixel unit of claim 14, wherein the second sub-pixel electrode comprises a second fringe electrode connected with ends of the second branch electrodes.

16. The pixel unit of claim 1, further comprising:
a shielding electrode disposed on at least one edge of the pixel electrode; and
a color-filter layer disposed between the pixel electrode and the shielding electrode, wherein the color-filter layer comprises a first color-filter region and a second color-filter region connected to the first color-filter region, the first color-filter region is disposed corresponding to the pixel electrode, the shielding electrode covers a connecting portion of the first color-filter region and the second color-filter region, and the first color-filter region and the second color-filter region have different colors.

17. A display panel, comprising:
a plurality of the pixel units according to claim 1 disposed on a substrate;
a counter substrate disposed opposite to the substrate; and
a display medium disposed between the substrate and the counter substrate.

18. The pixel unit of claim 1, wherein the at least one first connecting electrode substantially extends along the first direction to connect the first sub-pixel electrode to the second sub-pixel electrode.

19. The pixel unit of claim 1, wherein the at least one first connecting electrode is spaced apart from the gate line, the first data line, and the second data line in the vertical projection direction.

20. The pixel unit of claim 1, wherein the gap is spaced apart from the gate line in the vertical projection direction.

* * * * *